(12) United States Patent
Lee

(10) Patent No.: US 11,682,239 B2
(45) Date of Patent: Jun. 20, 2023

(54) MOBILE TERMINAL

(71) Applicant: LG ELECTRONICS INC., Seoul (KR)

(72) Inventor: Sunhyuk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 17/433,139

(22) PCT Filed: Aug. 13, 2019

(86) PCT No.: PCT/KR2019/010329
§ 371 (c)(1),
(2) Date: Aug. 23, 2021

(87) PCT Pub. No.: WO2021/029461
PCT Pub. Date: Feb. 18, 2021

(65) Prior Publication Data
US 2022/0157082 A1    May 19, 2022

(51) Int. Cl.
*G06F 3/01* (2006.01)
*G06V 40/20* (2022.01)
(Continued)

(52) U.S. Cl.
CPC ............ *G06V 40/28* (2022.01); *G01B 11/026* (2013.01); *G01B 11/03* (2013.01); *G06F 3/017* (2013.01); *H04W 12/06* (2013.01)

(58) Field of Classification Search
CPC ...... G06V 40/28; G01B 11/026; G01B 11/03; G06F 3/017; H04W 12/06
See application file for complete search history.

(56) References Cited

U.S. PATENT DOCUMENTS

2004/0150716 A1 *  8/2004  Ho ................... G08B 13/19647
                                                                  348/148
2010/0321289 A1 * 12/2010  Kim ..................... G06F 1/1626
                                                                  345/156
(Continued)

FOREIGN PATENT DOCUMENTS

CN              107341473 B      7/2018
KR        10-2011-0025462 A      3/2011
(Continued)

OTHER PUBLICATIONS

Jae-Yeon Won et al., Proximity Sensing Based on a Dynamic Vision Sensor for Mobile Devices, Jan. 1, 2015, IEEE Transactions on Industrial Electronics, vol. 62, No. 1, pp. 536-542 (Year: 2015).*

(Continued)

*Primary Examiner* — Tam T Tran
(74) *Attorney, Agent, or Firm* — Birch, Stewart, Kolasch & Birch, LLP

(57) ABSTRACT

Provided is a mobile terminal characterized by comprising: a display unit which outputs visual information; a depth camera which captures a subject and acquires a depth image; a memory which stores a vein pattern of a user's hand; and a control unit connected to the display unit, the depth camera, and the memory. The control unit identifies the shape of the user's hand from the depth image, authenticates the user using a pre-stored user vein pattern, and when the user is authenticated, executes a specific application in response to a three-dimensional gesture of the user's hand, and omits an authentication procedure required by the specific application.

20 Claims, 22 Drawing Sheets

(51) Int. Cl.
*G01B 11/02* (2006.01)
*G01B 11/03* (2006.01)
*H04W 12/06* (2021.01)

(56) References Cited

U.S. PATENT DOCUMENTS

2016/0054858 A1* 2/2016 Cronholm ............... G06F 3/005
 345/175
2019/0171804 A1* 6/2019 Lee ..................... H04N 5/2256

FOREIGN PATENT DOCUMENTS

| | | |
|---|---|---|
| KR | 10-2013-0097284 A | 9/2013 |
| KR | 10-2013-0122213 A | 11/2013 |
| KR | 10-1675830 B1 | 11/2016 |
| WO | WO 2014/168558 A1 | 10/2014 |

OTHER PUBLICATIONS

Nehal Al-Yamani et al., An Event Driven Surveillance System, Dec. 1, 2016, IEEE, pp. 1-4 (Year: 2016).*

* cited by examiner

FIG. 9

| Distance between the phone LCD and the user hand | Proximity sensor data |
|---|---|
| 1cm | 2047 |
| 2cm | 2047 |
| 3cm | 2047 |
| 4cm | 1450 |
| 5cm | 800 |
| 6cm | 500 |
| 7cm | 350 |
| 8cm | 285 |
| 9cm | 250 |
| 10cm | 220 |
| 11cm | 200 |
| 12cm | 185 |
| 13cm | 170 |
| 14cm | 160 |
| 15cm | 150 |
| 16cm | 140 |
| 17cm | 135 |
| 18cm | 130 |
| 19cm | 125 |
| 20cm~ | 120~110 |

MOBILE TERMINAL

CROSS REFERENCE TO RELATED APPLICATIONS

This application is the National Stage filing under 35 U.S.C. 371 of International Application No. PCT/KR2019/010329, filed on Aug. 13, 2019, which is all hereby incorporated by reference herein in their entirety.

TECHNICAL FIELD

The present disclosure relates to a mobile terminal, and more particularly to a mobile terminal applicable to a technical field capable of providing an input signal through a hand motion of a user who does not directly touch the mobile terminal.

BACKGROUND ART

Terminals may be divided into mobile/portable terminals and stationary terminals according to whether the mobile terminals are movable or not. The mobile terminals may be divided into handheld terminals and vehicle mounted terminals according to whether the terminals can be carried directly by the user.

The functions of mobile terminals have been diversified. For example, the functions include data and voice communication, photographing and video shooting through a camera, voice recording, music file playback through a speaker system, and outputting of an image or video on a display. Some terminals are equipped with an electronic gaming function or multimedia player function. In particular, recent mobile terminals can receive multicast signals that provide visual content such as broadcast and video or television programs.

With development of three-dimensional (3D) depth camera technology, the mobile terminal has a user interface (UI) that detects a motion or gesture of the user based on three-dimensional (3D) vision technology to control the mobile terminal. The three-dimensional (3D) vision-based UI can be applied to various applications by supplementing the existing two-dimensional (2D) touch-based UI. For example, in Augmented Reality (AR) applications, the three-dimensional (3D) vision-based UI can control objects in three dimensions. Even when the device is in a position where the user cannot touch the device, the three-dimensional (3D) vision-based UI allows the user to control the device. When the user's hand is dirty or when wearing gloves, preventing touch control, the three-dimensional (3D) vision-based UI allows the user to control the device. Accordingly, the three-dimensional (3D) vision-based gesture recognition technology is in the spotlight.

DISCLOSURE

Technical Problem

An object of the present disclosure is to provide a mobile terminal for enabling a depth camera to activate a proximity sensor, and preventing the depth camera from being mandatorily activated regardless of user's intention.

Technical Solutions

In accordance with an aspect of the present disclosure, a mobile terminal may include a display unit configured to output visual information, a depth camera configured to obtain a depth image by capturing a target object, a proximity sensor configured to distinguish a proximity of the target object approaching the mobile terminal, and a controller connected to the display unit, the depth camera, and the proximity sensor. If a first proximity, a first separation, a second proximity, and a second separation of the target object approaching or moving away from the mobile terminal are sequentially sensed for a predetermined time, the controller activates the depth camera to obtain the depth image.

The proximity sensor may emit light to the target object, and may distinguish a proximity of the target object using light quantity data reflected from the target object.

The proximity sensor may set a reference value using a moving average value of the light quantity data, may set a first threshold greater than the reference value and a second threshold greater than the first threshold, and may distinguish a proximity or separation state of the target object based on the first threshold and the second threshold.

The proximity sensor may obtain the moving average value in response to N-th obtained light quantity data, and if a difference between the N-th obtained light quantity data and (N+1)-th obtained light quantity data is at least a predetermined value, may set the moving average value obtained in response to the N-th obtained light quantity data to the reference value.

The proximity sensor may obtain the moving average value by averaging the N-th obtained light quantity data and light quantity data that has been continuously obtained a predetermined number of times.

The first threshold may include a first proximity threshold configured to define a proximity state of the target object, and a first separation threshold less than the first proximity threshold, and configured to define a separation state of the target object. The second threshold may include a second proximity threshold configured to define a proximity state of the target object, and a second separation threshold less than the second proximity threshold, and configured to define a separation state of the target object.

A difference between the second proximity threshold and the second separation threshold may be greater than a difference between the first proximity threshold and the first separation threshold.

The controller may sense a first proximity of the target object based on the first threshold, and may sense a second proximity of the target object based on the second threshold.

If light quantity data obtained through the proximity sensor is less than the first separation threshold and is then greater than the first proximity threshold, the controller may sense a first proximity of the target object. If light quantity data obtained after the first proximity of the target object is sensed is greater than the first proximity threshold and is then less than the first separation threshold, the controller may sense a first separation of the target object. If light quantity data obtained after the first separation of the target object is sensed is less than the first separation threshold and is then greater than the first proximity threshold, the controller may sense a second proximity of the target object. If light quantity data obtained after the second proximity of the target object is sensed is less than the first proximity threshold and is then less than the first separation threshold, the controller may sense a second separation of the target object.

If light quantity data obtained through the proximity sensor is less than the first separation threshold and is then greater than the first proximity threshold, the controller may sense a first proximity of the target object. If light quantity data obtained after the first proximity of the target object is sensed is greater than the second proximity threshold and is then less than the second separation threshold, the controller may sense a first separation of the target object. If light quantity data obtained after the first separation of the target object is sensed is less than the first separation threshold and is then greater than the first proximity threshold, the controller may sense a second proximity of the target object. If light quantity data obtained after the second proximity of the target object is sensed is less than the second proximity threshold and is then less than the second separation threshold, the controller may sense a second separation of the target object.

If light quantity data obtained after the first proximity of the target object is sensed is less than the second separation threshold and is then greater than the second separation threshold, the controller may maintain a first proximity state of the target object. If light quantity data obtained after the first separation of the target object is sensed is greater than the first proximity threshold and is then less than the first separation threshold, the controller may sense a second separation state of the target object. If light quantity data obtained after the second proximity of the target object is sensed is less than the second separation threshold and is then greater than the second separation threshold, the controller may sense a second proximity state of the target object.

If light quantity data obtained through the proximity sensor is less than the first separation threshold and is then greater than the first proximity threshold, the controller may sense a first proximity of the target object. If light quantity data obtained after the first proximity of the target object is sensed is greater than the second proximity threshold and is then less than the second separation threshold, the controller may sense a first separation of the target object. If light quantity data obtained after the first separation of the target object is sensed is less than the second separation threshold and is then greater than the second proximity threshold, the controller may sense a second proximity of the target object. If light quantity data obtained after the second proximity of the target object is sensed is less than the second proximity threshold and is then less than the second separation threshold, the controller may sense a second separation of the target object.

If light quantity data obtained after the first proximity of the target object is sensed is less than the second separation threshold and is then larger than the second separation threshold, the controller may maintain a first proximity state of the target object.

If light quantity data obtained through the proximity sensor is less than the first separation threshold and is then greater than the first proximity threshold, the controller may sense a first proximity of the target object. If light quantity data obtained after the first proximity of the target object is sensed is greater than the second proximity threshold and is then less than the second separation threshold, the controller may sense a first separation of the target object. If light quantity data obtained after the first separation of the target object is sensed is less than the first separation threshold and is then greater than the first proximity threshold, the controller may sense a second proximity of the target object. If light quantity data obtained after the second proximity of the target object is sensed is less than the first proximity threshold and is then less than the first separation threshold, the controller may sense a second separation of the target object.'

If light quantity data obtained after the first proximity of the target object is sensed is less than the second separation threshold and is then greater than the second separation threshold, the controller may maintain a first proximity state of the target object. If light quantity data obtained after the first separation of the target object is sensed is greater than the first proximity threshold and is then less than the first separation threshold, the controller may maintain a first separation state of the target object.

If light quantity data obtained through the proximity sensor is less than the first separation threshold and is then greater than the first proximity threshold, the controller may sense a first proximity of the target object. If light quantity data obtained after the first proximity of the target object is sensed is greater than the first proximity threshold and is then less than the first separation threshold, the controller may sense a first separation of the target object. If light quantity data obtained after the first separation of the target object is sensed is less than the first separation threshold and is then greater than the first proximity threshold, the controller may sense a second proximity of the target object. If light quantity data obtained after the second proximity of the target object is sensed is less than the second proximity threshold and is then less than the second separation threshold, the controller may sense a second separation of the target object.

If light quantity data obtained after the second proximity of the target object is sensed is less than the second separation threshold and is then greater than the second proximity threshold, the controller may maintain a second proximity state of the target object.

If the first proximity, the first separation, the second proximity, and the second separation of the target object are not sequentially sensed for the predetermined time after the reference value is set, the controller may reset the reference value, and may recalculate a moving average value based on the reset reference value.

If a shape of a user hand is not distinguished from the depth image captured by the activated depth camera for a predetermined time, the controller may deactivate the depth camera, and may recalculate a moving average value.

If the depth camera is activated in a situation where the display unit is deactivated, the controller may activate the depth camera and the display unit.

In accordance with an aspect of the present disclosure, a mobile terminal may include a display unit configured to output visual information, a proximity sensor configured to distinguish a proximity of the target object approaching the mobile terminal, and a controller connected to the display unit and the proximity sensor. If a first proximity, a first separation, a second proximity, and a second separation of the target object approaching or moving away from the mobile terminal are sequentially sensed for a predetermined time, the controller may activate the display unit.

Advantageous Effects

As apparent from the above description, the effects of the mobile terminal according to the present disclosure are as follows.

The present disclosure can enable the display of the mobile terminal to switch to an active state without touch motion of the user who can touch the mobile terminal.

The present disclosure can improve energy efficiency by optionally operating the depth camera.

The present disclosure can allow the display of the mobile terminal to switch to the active state using the proximity sensor or can allow the depth camera to switch to the active state using the proximity sensor, and can prevent the display or the depth camera from switching to the active state regardless of user intention.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIGS. 8 and 9 are diagrams illustrating light quantity data obtained by the proximity sensor in response to the distance between the mobile terminal and a target object according to an embodiment of the present disclosure.

BEST MODE

Figure 1A:
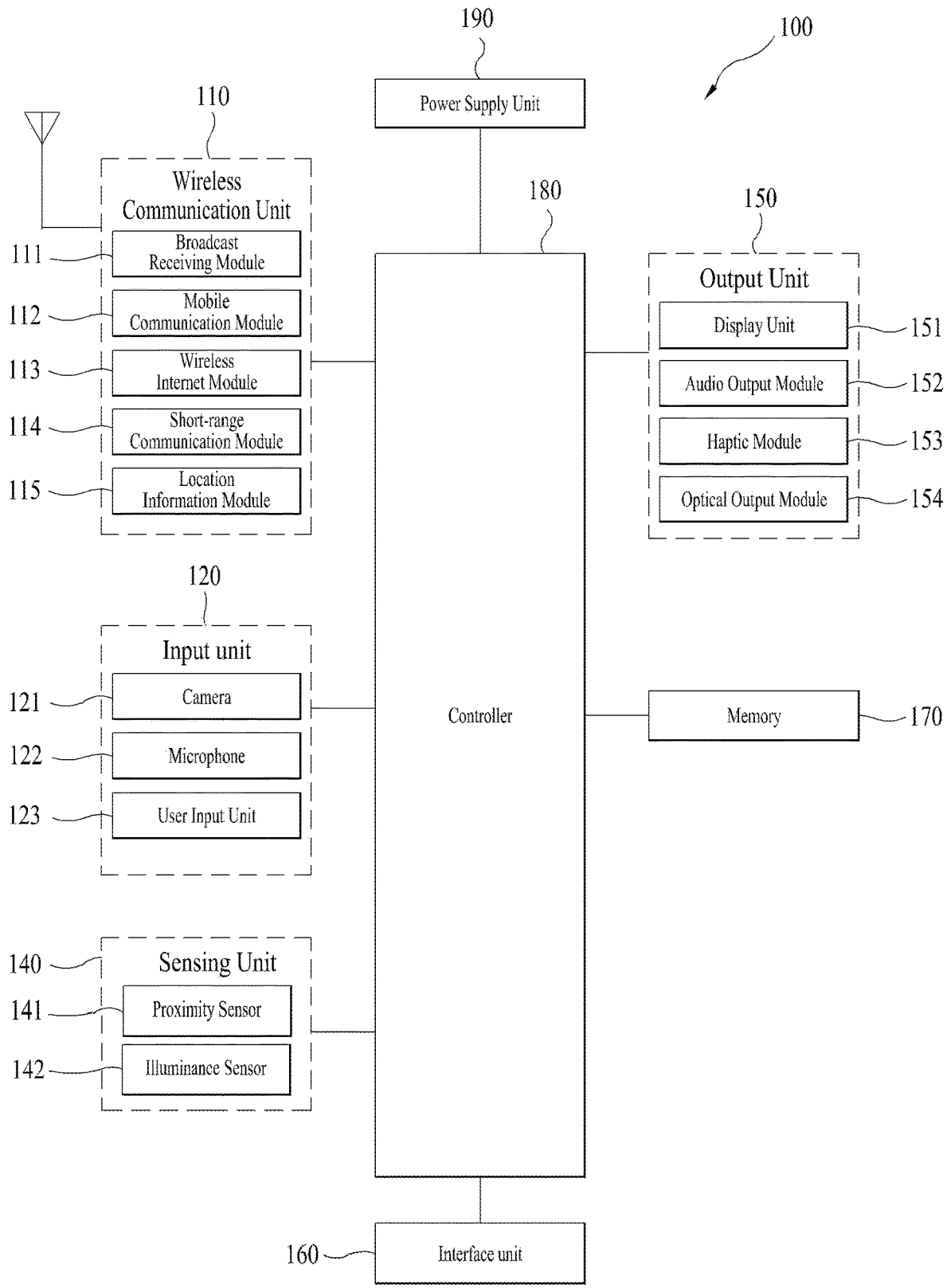
FIG. 1A is a block diagram illustrating a mobile terminal according to the present disclosure.

Reference will now be made in detail to the preferred embodiments of the present disclosure, examples of which are illustrated in the accompanying drawings. Wherever possible, the same reference numbers will be used throughout the drawings to refer to the same or like parts. In the following description, the suffixes "module" and "unit" contained in terms of constituent elements to be described will be selected or used together in consideration only of the convenience of writing the following specification, and the suffixes "module" and "unit" do not necessarily have different meanings or roles. In the following description, known functions or structures, which may confuse the substance of the present disclosure, are not explained. While the present disclosure permits a variety of modifications and changes, specific embodiments of the present disclosure illustrated in the drawings will be described below in detail. However, the detailed description is not intended to limit the present disclosure to the described specific forms. Rather, the present disclosure includes all modifications, equivalents, and substitutions without departing from the spirit of the invention as defined in the claims.

Mobile terminals described herein may include a cellular phone, a smartphone, a laptop, a digital broadcasting terminal, a personal digital assistant (PDA), a portable multimedia player (PMP), a navigation system, a slate PC, a tablet PC, an ultrabook, wearable devices (for example, a smartwatch, smartglasses, a head mounted display (HMD), and the like).

However, it will be readily apparent to those skilled in the art that the configurations applicable to the embodiments of the present disclosure can be applied not only to mobile terminals, but also to fixed terminals such as a digital TV, a desktop computer, a digital signage, etc.

Figure 1B:
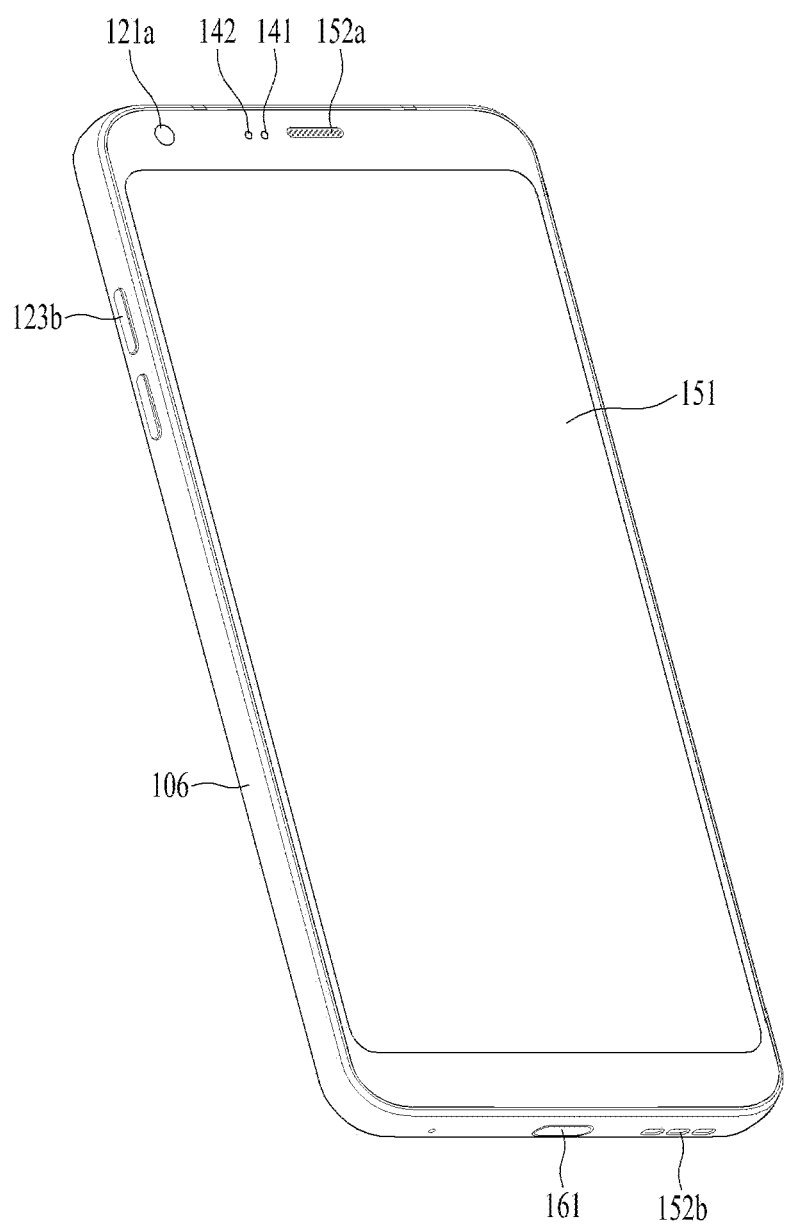
FIGS. 1B and 1C are perspective views illustrating examples of the mobile terminal when viewed from different directions according to the present disclosure.
Figure 1C:
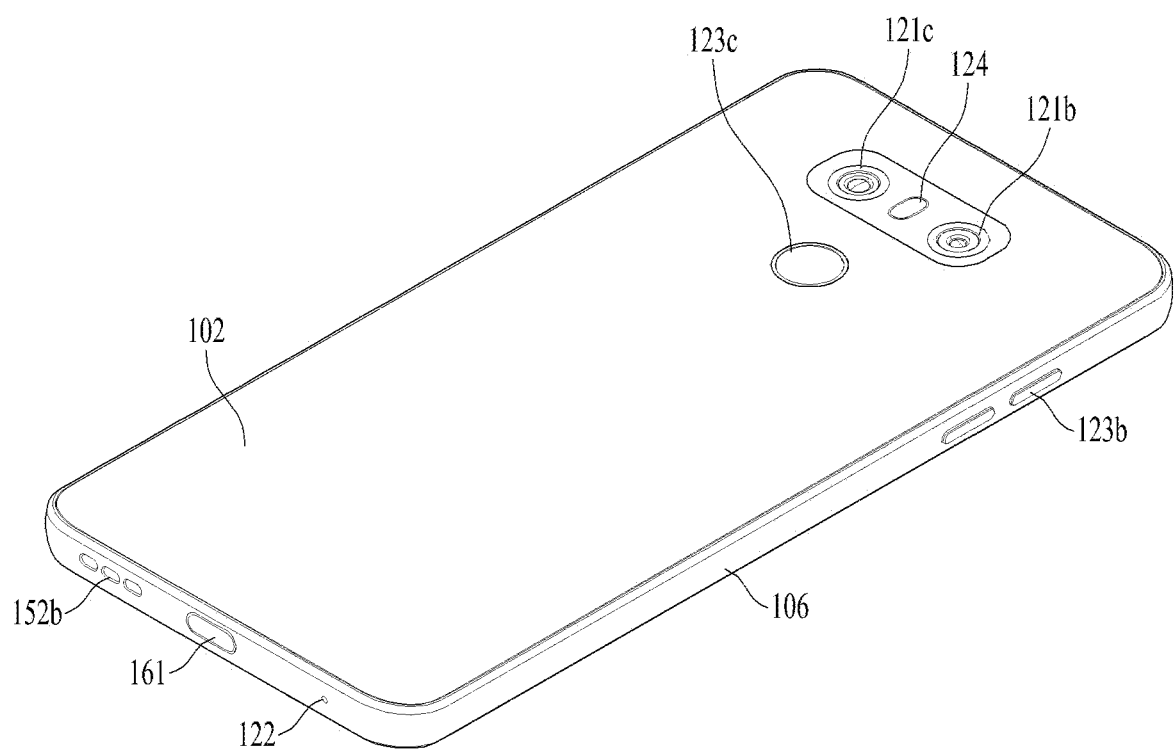

FIG. 1A is a block diagram illustrating a mobile terminal according to the present disclosure. FIGS. 1B and 1C are perspective views illustrating examples of the mobile terminal when viewed from different directions according to the present disclosure.

The mobile terminal 100 may include a wireless communication unit 110, an input unit 120, a sensing unit 140, an output unit 150, an interface unit 160, a memory 170, a controller 180, a power-supply unit 190, and the like. The constituent elements shown in FIG. 1A are not always required to implement the mobile terminal 100, such that it should be noted that the mobile terminal 100 according to the present disclosure may include more or fewer components than the elements listed above.

More specifically, among the above-described constituent components, the wireless communication unit 110 may include at least one module for implementing any one of communication between the mobile terminal 100 and a wireless communication system, communication between the mobile terminal 100 and another mobile terminal 100, and communication between the mobile terminal 100 and an external server. In addition, the wireless communication unit 110 may include at least one module for connecting the mobile terminal 100 to at least one network.

The wireless communication unit 110 may include at least one of a broadcast reception module 111, a mobile communication module 112, a wireless Internet module 113, a short-range communication module 114, and a location information module 115 such as a GPS module.

The input unit 120 may include a camera 121 or an image input unit for receiving image signals, a microphone 122 or an audio input unit for receiving audio signals, and a user input unit 123 (e.g., a touch key, a mechanical key, etc.) for receiving information from the user. Voice data or image data collected by the input unit 120 may be analyzed so that the analyzed result can be processed as a control command of the user as necessary.

The sensing unit 140 may include one or more sensors configured to sense internal information of the mobile terminal, peripheral environmental information of the mobile terminal, user information, and the like. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radioactivity detection sensor, a thermal sensor, and a gas sensor, etc.), and a chemical sensor (for example, an electronic nose, a healthcare sensor, a biometric sensor, and the like). On the other hand, the mobile terminal disclosed in the present disclosure may combine various kinds of information sensed by at least two of the above-described sensors, and may use the combined information.

The output unit 150 may generate output signals related to visual, auditory, tactile sensation, or the like. The output unit 150 may include at least one of a display unit 151, an audio output unit 152, a haptic module 153, and an optical (or light) output unit. The display unit may construct a mutual layer structure along with a touch sensor, or may be formed integrally with the touch sensor, such that the display unit can be implemented as a touchscreen. The touchscreen may serve as a user input unit 123 that provides an input interface to be used between the mobile terminal 100 and the user, and at the same time may provide an output interface to be used between the mobile terminal 100 and the user.

The interface unit 160 may serve as a passage between various types of external devices connected to the mobile terminal 100. The interface unit 160 may include at least one of a wired/wireless headset port, an external charger port, a wired/wireless data port, a memory card port, a port connected to a device provided with an identification (ID) module, an audio input/output (I/O) port, a video input/output (I/O) port, and an earphone port. If the external device is connected to the interface unit 160, the mobile terminal 100 may perform appropriate control related to the connected external device.

In addition, the memory 170 may store data needed to support various functions of the mobile terminal 100. The memory 170 may store a plurality of application programs (or applications) executed in the mobile terminal 100, and data or instructions required to operate the mobile terminal 100. At least some of the application programs may be downloaded from an external server through wireless communication. For basic functions (e.g., an incoming call, an outgoing call, reception of a message, sending of a message, etc.) of the mobile terminal 100, at least some of the application programs may be pre-installed in the mobile terminal 100 at a stage of manufacturing the product. Meanwhile, the application programs may be stored in the memory 170, and may be installed in the mobile terminal 100, so that the application programs can enable the mobile terminal 100 to perform necessary operations (or functions).

In addition to the operation related to the application programs, the controller 180 may control overall operation of the mobile terminal 100. The controller 180 may process signals, data, and information that are input or output through the above-described constituent components, or may drive the application programs stored in the memory 170, so that the controller 180 can provide the user with appropriate information or functions or can process the appropriate information or functions.

In order to drive the application programs stored in the memory 170, the controller 180 can control at least some of the components shown in FIG. 1A. Moreover, in order to drive the application programs, the controller 180 can combine at least two of the components included in the mobile terminal 100, and can operate the combination of the components.

The power-supply unit 190 may receive external power or internal power under control of the controller 180, such that the power-supply unit 190 may supply the received power to the constituent components included in the mobile terminal 100. The power-supply unit 190 may include a battery. The battery may be implemented as an embedded battery or a replaceable battery.

At least some of the components may operate in cooperation with each other to implement an operation, control, or control method of a mobile terminal according to various embodiments described below. In addition, the operation, control, or control method of the mobile terminal may be implemented on the mobile terminal by driving at least one application program stored in the memory 170.

FIGS. 1B and 1C illustrate basic features of a foldable mobile terminal in an unfolded state.

The mobile terminal 100 may include a display unit 151, first and second audio output units 152a and 152b, a proximity sensor 141, an illumination sensor 142, an optical output unit 154, first and second cameras 121a and 121b, first and second manipulation units 123a and 123b, a microphone 122, an interface unit 160, etc.

Referring to FIGS. 1B and 1C, the display unit 151, the first audio output unit 152a, the proximity sensor 141, the illumination sensor 142, the optical output unit, the first camera 121a, and the first manipulation unit 123a may be disposed at a front surface of a body frame of the mobile terminal 100. The second manipulation unit 123b, the microphone 122, and the interface unit 160 may be disposed at a side surface of the body frame (hereinafter referred to as a terminal body) of the mobile terminal 100. The second audio output unit 152b and the second camera 121b may be disposed at a rear surface of the body frame of the mobile terminal 100.

However, the above-described components are not limited to this arrangement. The above-described components may be excluded or replaced as needed, or may be disposed at other surfaces as needed. For example, the first manipulation unit 123a may not be disposed at the front surface of the terminal body, and the second audio output unit 152b may be disposed at the side surface of the terminal body rather than the rear surface of the terminal body.

The display unit 151 may be configured to output information processed in the mobile terminal 100. For example, the display unit 151 may display execution screen information of the application program executed in the mobile terminal 100 or user interface (UI) and graphical user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a three-dimensional (3D) display, and an e-ink display.

In addition, the display unit 151 may be implemented as two or more display devices according to implementation types of the mobile terminal 100. In this case, the plurality of display units spaced apart from each other may be disposed at one surface of the mobile terminal 100, may be formed integrally at one surface of the mobile terminal 100, or may be respectively disposed at different surfaces of the mobile terminal 100.

The display unit 151 may include a touch sensor for sensing a user's touch on the display unit 151 so that the display unit 151 can receive a control command through the user's touch. In more detail, when the user touches the display unit 151, the touch sensor senses the user's touch, and the controller 180 may generate a control command corresponding to the user's touch. The content received by the user's touch may be text or a numerical value, or a menu item which can be indicated or designated in various modes.

Meanwhile, the touch sensor may be formed in a film having a touch pattern to be disposed between a window 151a covering the display unit 151 and a plurality of layers constructing the display unit 151, or may be formed in a metal wire directly patterned on the rear surface of the window 151a. Alternatively, the touch sensor may be integrally formed with the display unit 151. For example, the touch sensor may be disposed on a substrate of the display unit 151 or provided inside the display unit 151.

As such, the display unit 151 may form a touchscreen together with the touch sensor, so that the touch screen may serve as the user input unit 123 (see FIG. 1A). In this case, the touchscreen may replace at least some of the functions of the first manipulation unit 123a.

The first audio output unit 152a may be implemented as a receiver for transmitting a call sound to user's ears. The second audio output unit 152b may be implemented as a loud speaker for outputting various kinds of alarm sounds or playback sounds of multimedia.

A sound hole for discharging sound generated from the first audio output unit 152a may be formed in the window 151a of the display unit 151, without being limited thereto. Here, the sound generated from the first audio output unit 152a may be released along an assembly gap between the structural bodies (e.g., between the window 151a and the front case 101). In this case, the external appearance of the mobile terminal 100 may be more simplified because a hole independently formed to output audio sounds is formed to be invisible or hidden when viewed from the outside.

The optical output unit may be configured to output light for indicating occurrence of events. Examples of such events may include message reception, call signal reception, a missed call, an alarm, schedule notification, email reception, information reception through applications, etc. When the user has confirmed the event, the controller 180 may control the optical output unit to stop emission of light.

The first camera 121a may process image frames such as still or moving images obtained by an image sensor in a photographing (or capture) mode or a video call mode. The processed image frames may be displayed on the display unit 151, and may be stored in the memory 170.

The first and second manipulation units 123a and 123b may be examples of the user input unit 123 that is manipulated to receive a command for controlling the operation of the mobile terminal 100, and may also be commonly referred to as a manipulation portion. The first and second manipulation units 123a and 123b may employ any tactile method that allows the user to perform tactile manipulation such as touch, push, scroll, or the like. In addition, the first and second manipulation units 123a and 123b may also employ any non-tactile method that allows the user to perform non-tactile manipulation such as proximity touch, hovering touch, etc. without tactile sensation on the display unit.

The first manipulation unit 123a shown in FIG. 1B is implemented as a touch key for convenience of description, without being limited thereto. For example, the first manipulation unit 123a may be a mechanical key or a combination of a touch key and a push key.

The content entered by the first and second manipulation units 123a and 123b may be established in various ways. For example, the first manipulation unit 123a may receive commands (e.g., a menu, home key, cancel, search, etc.) from the user, and the second manipulation unit 123b may receive a command for controlling a volume level being output from the first or second audio output unit 152a or 152b and a command for switching to a touch recognition mode of the display unit 151, and the like.

On the other hand, as another example of the user input unit 123a, a rear input unit (not shown) may be provided on the rear surface of the terminal body of the mobile terminal. The rear input unit may operate to receive a command for controlling the mobile terminal 100, and the content entered by the rear input unit may be established in various ways. For example, the rear input unit may receive commands such as power on/off, start, end, scroll, etc., commands for adjusting a volume level being output from the first and second audio output units 152a and 152b, and commands for switching to the touch recognition mode of the display unit 151. The rear input unit may be implemented to permit a touch input, a push input, or a combination thereof.

The rear input unit may be disposed to overlap the display unit 151 in a thickness direction of the terminal body. As one example, the rear input unit may be disposed at an upper end portion of the rear surface of the terminal body so that the user can easily manipulate the mobile terminal using a forefinger of the user who grasps the mobile terminal with one hand. However, the scope or spirit of the present disclosure is not limited thereto, and the position of the rear input unit may be changed as necessary.

When the rear input unit is provided on the rear surface of the terminal body, a new user interface (UI) can be implemented using the rear input unit. In addition, the touchscreen or the rear input unit can substitute for at least some of the functions of the first manipulation unit 123a provided at the front surface of the terminal body. As such, when the first manipulation unit 123a is not disposed at the front surface of the terminal body, the display unit 151 may be implemented as a larger screen.

Meanwhile, the mobile terminal 100 may include a fingerprint recognition sensor 143 for recognizing a fingerprint of the user. The controller 180 may use the fingerprint information sensed by the fingerprint recognition sensor 143 as a part of an authentication procedure. The fingerprint recognition sensor may be embedded in the display unit 151 or the user input unit 123, or may be provided at a separate location.

The microphone 122 may be configured to receive a voice of the user, other sounds, etc. The microphone 122 may be implemented as multiple microphones that are capable of being installed at a plurality of locations to receive stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power-supply terminal for supplying power to the mobile terminal 100. The interface unit 160 may be implemented in the form of a socket for accommodating an external card such as a Subscriber Identification Module (SIM), a User Identity Module (UIM), or a memory card for information storage.

A second camera 121b may be disposed at the rear surface of the terminal body. In this case, the second camera 121b may be designed to have a photographing direction that is substantially opposite to the first camera 121a.

The second camera 121b may include a plurality of lenses arranged along at least one line. In this case, the plurality of lenses may also be arranged in a matrix array. The second camera 121b including the plurality of lenses may be referred to as an array camera. If the second camera 121b is implemented as the array camera, the second camera 121b may capture images in various ways using the plurality of lenses, thereby obtaining higher-quality images.

A flash 124 may be disposed adjacent to the second camera 121b. When the second camera 121b captures (or photographs) a target object, the flash 124 may emit light toward the target object.

The terminal body may further include a second audio output unit 152b. The second audio output unit 152b may implement stereophonic sound functions together with the first audio output unit 152b, and may be used to implement a speakerphone mode during call communication.

At least one antenna for wireless communication may be provided in the terminal body. The antenna may be embedded in the terminal body, or may be formed in the case. For example, the antenna that forms some parts of the broadcast reception module 111 (see FIG. 1A) may be configured to be withdrawn from the terminal body. Alternatively, the antenna may be formed in a film shape to be attached to an inner surface of the rear cover 103, and the case including a conductive material may be configured to act as the antenna.

The terminal body may include a power-supply unit 190 (see FIG. 1A) for supplying power to the mobile terminal 100. The power-supply unit 190 may include a battery 191 that is embedded in the terminal body or detachably coupled to the terminal body.

The battery 191 may receive power through a power cable connected to the interface unit 160. In addition, the battery 191 may be configured to be wirelessly rechargeable through a wireless charger. Such wireless charging can be implemented by magnetic induction or magnetic resonance.

In the present disclosure, the rear cover 103 may be coupled to the rear case 102 to cover the battery 191, so that the rear cover 103 can prevent separation of the battery 191 and can protect the battery 191 from external impact or foreign materials. When the battery 192 is detachably coupled to the terminal body, the rear cover 103 can be detachably coupled to the rear case 102.

The camera (the camera 121 shown in FIG. 1 or the camera 121a shown in FIG. 2A) according to the present disclosure may be located around the touchscreen of the mobile terminal. Therefore, the camera can detect depth information of a target object (e.g., a user's finger) within a predetermined distance from the touchscreen of the mobile terminal. The camera capable of detecting depth information of the target object will be referred to as a depth camera.

The present disclosure provides the following two approaches for implementing the depth camera. The first approach is to use multiple cameras (or lenses), which can allow at least two cameras to capture visible light and can form a three-dimensional (3D) image using depth information. The second approach is a method for mounting a separate sensor for sensing depth information to the camera module. More particularly, a structured light (SL) scheme and a Time of Flight (ToF) scheme can be applied to the second approach.

In the above-described SL scheme, after a laser beam of a specific pattern such as a straight line or a lattice pattern is emitted to a target object to be captured, pattern modification information is analyzed according to the shape of a surface of the target object. Furthermore, after the depth information is calculated, the calculated depth information is synthesized with a photograph taken by the image sensor, resulting in the 3D-based imaging result. To this end, a laser infrared (IR) projector for emitting a laser beam having a specific pattern, an infrared depth sensor, an image sensor, a 3D processor, etc. can be used.

The ToF scheme described above may calculate depth information by measuring a time duration for which the laser is emitted toward the target object and is then reflected therefrom and returns to an initial emission position. Then, the 3D-based imaging result may be obtained by combining an image captured by the image sensor and depth information with each other. To this end, a laser infrared (IR) projector, a reception sensor, an image sensor, and a 3D processor can be used.

Figure 2:
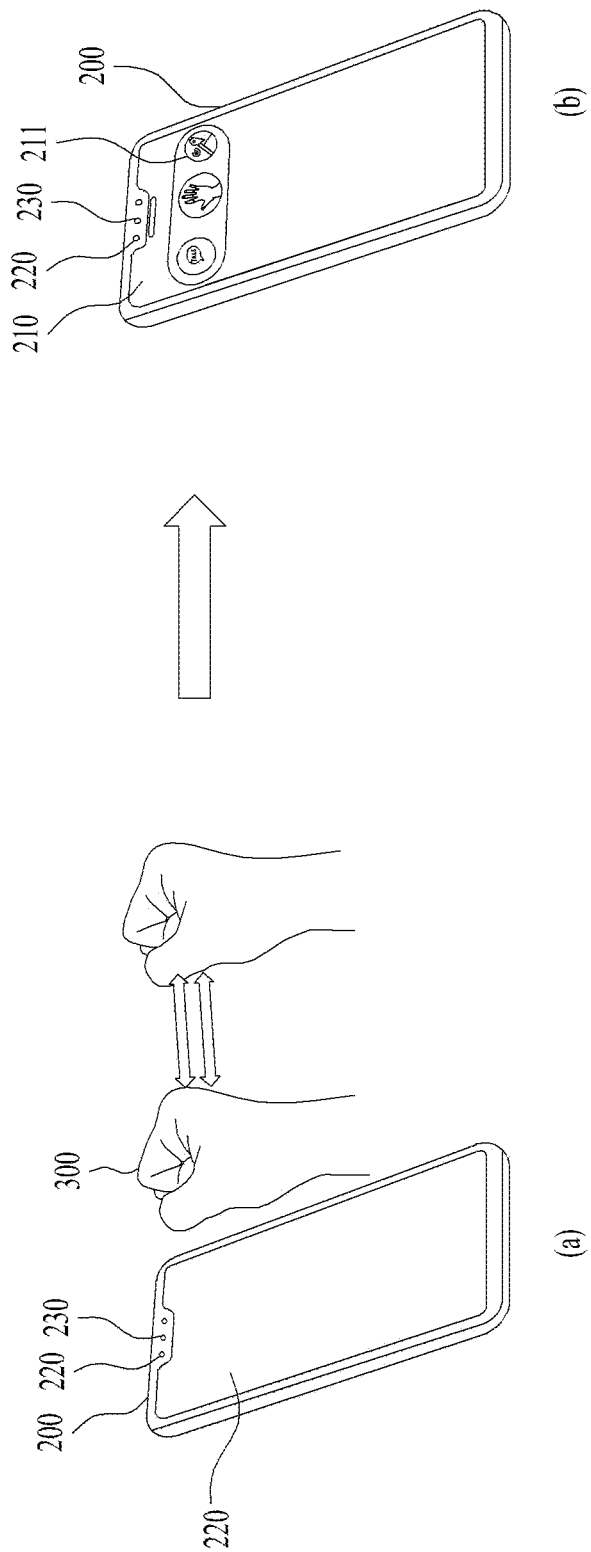
FIG. 2 is a conceptual diagram illustrating a method for enabling the mobile terminal to switch to an active state without a physical touch action of the user who can touch the mobile terminal.

FIG. 2 is a conceptual diagram illustrating a method for enabling the mobile terminal to switch to an active state without a physical touch action of the user who can touch the mobile terminal.

The mobile terminal may include a display unit 210 for outputting visual information, a depth camera 220 for acquiring a depth image by photographing a target object 300, and a proximity sensor 230 for detecting close proximity of the target object 300 approaching the mobile terminal.

The display unit 210 may output visual information in an active state, and may not output visual information in an inactive state. In this case, the display unit 210 in the inactive state may output visual information in a restricted manner. For example, the display unit 210 in the inactive state may selectively output visual information that indicates a clock in one region.

The depth camera 210 according to the present disclosure can obtain a depth image including depth information of the target object 300. The depth camera 210 may be a Time of Flight (ToF) camera. However, the depth camera 210 according to the present disclosure is not limited to the ToF camera, and may include other types of depth cameras capable of acquiring depth information.

The proximity sensor 230 may distinguish proximity or separation of a target object 300. The proximity sensor 230 may not be a sensor for acquiring detailed depth information of the target object 300, or may be a sensor for distinguishing only the proximity or separation of the target object 300. In more detail, the proximity sensor 230 may emit light to the target object 300, and may distinguish the proximity of the target object 300 using light quantity data reflected from the target object 300. If the light quantity data received by the proximity sensor 230 is greater than a predetermined value (i.e., if the proximity sensor 230 receives a larger amount of light quantity data), the proximity sensor 230 can recognize that the target object 300 is in a proximity state indicating that the target object 300 approaches the mobile terminal. Similarly, when light quantity data is less than a predetermined value (i.e., when the proximity sensor 230 receives a smaller amount of light quantity data), the proximity sensor 230 can recognize that the target object 300 is in a separation state indicating that the target object 300 is moving away from the mobile terminal.

The proximity sensor 230 may refer to a sensor that selectively distinguishes whether the target object is in a proximity state or a separation state without obtaining detailed depth information. The proximity sensor 230 can be driven with less energy than the depth camera 210 when information acquired by the proximity sensor 230 is not specific. That is, the operation of optionally (or selectively) using the depth camera 210 in a situation where the proximity sensor 230 is continuously used may be considered more efficient in terms of energy than the other operation of continuously using the depth camera 210 without using the proximity sensor 230.

In more detail, FIG. 2A is a conceptual diagram illustrating a method for enabling the proximity sensor 230 to sense the proximity of the target object 300 in the situation where the display 210 is in an inactive state. FIG. 2B is a conceptual diagram illustrating a method for enabling the proximity sensor 230 to sense the proximity of the target object 300 in a manner that the display 310 switches to the active state and outputs a graphical interface 211. The graphical interface 211 may refer to an interface that connects a motion of the user's hand sensed by the depth camera 230 to a specific function of the mobile terminal. In this case, the mobile terminal 200 shown in FIG. 2A may allow the depth camera 220 to be in the inactive state, and the mobile terminal 200 shown in FIG. 2B may allow the depth camera 220 to switch to the active state so that the depth camera 220 can obtain a depth image. That is, when the proximity sensor 230 detects the proximity of the target object 300, the depth camera 220 may be optionally activated to obtain a depth image.

However, when the display unit 210 is activated by the proximity sensor 220, the display unit 210 may be unexpectedly and frequently activated regardless of user intention. For example, when the user's hand unexpectedly passes over the mobile terminal 100 placed on a table, the display unit 210 may be activated regardless of user intention. In this case, power of the mobile terminal may be unnecessarily consumed, and the user may also be distracted. Similarly, when the depth camera 220 frequently switches to the active state by the proximity sensor 220, power of the mobile terminal may be unnecessarily consumed.

In order to activate the display unit 210 and/or the depth camera 220 through the proximity sensor 220 while simultaneously preventing the display unit 210 and/or the depth camera 220 from being unexpectedly activated regardless of user intention, the display unit 210 and/or the depth camera 220 can be activated when the target object 300 approaches the proximity sensor 220 two times. In more detail, when the proximity sensor 230 sequentially detects a first proximity, a first separation, a second proximity sensor, and a second separation of the target object 300 approaching or moving away from the proximity sensor 230, the present disclosure can activate the display unit 210 and/or the depth camera 220. At this time, when the proximity sensor 230 sequentially detects the first proximity, the first separation, the second proximity, and the second separation of the target object 300 approaching or moving away from the proximity sensor 230 within a predetermined time, the display unit 210 and/or the depth camera 2230 can be activated.

A method for enabling the proximity sensor 220 to sequentially detect the first proximity, the first separation, the first proximity, and the second separation of the target object 300 approaching or moving away from the proximity sensor 220 will hereinafter be described with reference to the attached drawings.

Figure 3:
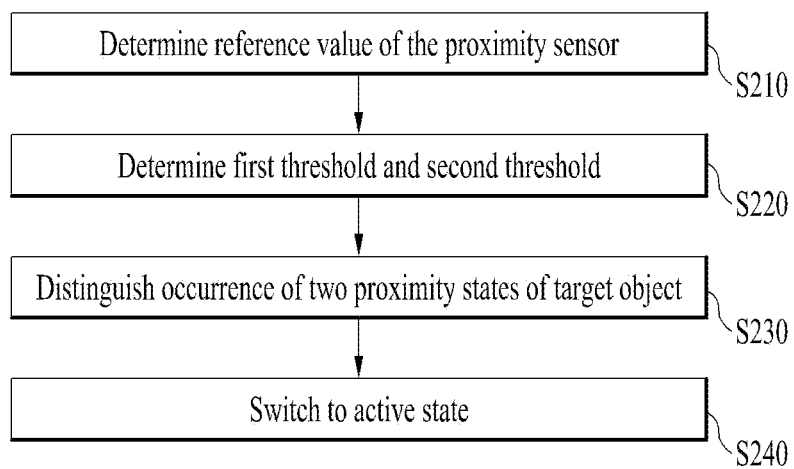
FIG. 3 is a flowchart illustrating operations of a process for enabling the mobile terminal to switch to an active state using a proximity sensor according to an embodiment of the present disclosure.

FIG. 3 is a flowchart illustrating operations of a process for enabling the mobile terminal to switch to an active state using the proximity sensor according to an embodiment of the present disclosure.

Referring to FIG. 3, the mobile terminal according to the present disclosure can establish a reference value based on light quantity data obtained through the proximity sensor (S210). The proximity sensor of the present disclosure may not have a fixed reference value, and may be differently established according to various situations. A process for enabling the proximity sensor to determine the reference value will hereinafter be described with reference to FIG. 4.

The mobile terminal according to the present disclosure may determine a first threshold and a second threshold based on the determined reference value (S220). In this case, the first threshold may be a discriminable value for distinguishing the proximity of the target object, and the second threshold may be a discriminable value for distinguishing the separation of the target object. In more detail, each of the first and second thresholds may be higher than the reference value. The second threshold may be higher than the first threshold. Light quantity data obtained by the proximity sensor may have a larger value as the target object moves closer to the proximity sensor. Therefore, whereas the amount of light quantity data obtained by the proximity sensor in the situation where the target object is not in close proximity to the mobile terminal is small, the amount of light quantity data obtained by the proximity sensor in the situation where the target object is in close proximity to the mobile terminal may be large. In this case, the reference value may be established when the target object is not in proximity to the mobile terminal, and may be lower than each of the first threshold and the second threshold. The second threshold may be a discriminable value that determines the proximity of the target object when the target object approaches closer to the mobile terminal. The first threshold and the second threshold will hereinafter be described with reference to FIGS. 5 and 7.

The present disclosure may determine the reference value, may determine the first threshold and the second threshold based on the reference value, and may determine whether the target object approaches the mobile terminal two times (hereinafter referred to as two proximity states of the mobile terminal) based on a change in the obtained light quantity data (S230). In this case, the two proximity states of the target object may refer to a condition in which a first proximity, a first separation, a second proximity, and a second separation are sequentially arranged. In the present disclosure, a method for enabling the mobile terminal to discriminate occurrence of two proximity states of the target object approaching the mobile terminal using the first threshold and the second threshold of the proximity sensor will be described later with reference to the drawings from FIG. 7.

When occurrence of two proximity states of the target object is determined through the proximity sensor, the present disclosure may enable the mobile terminal to switch to the active state (S240). The active state of the mobile terminal may include at least one of a first state in which the display unit outputs visual graphic data and a second state in which the depth camera obtains a depth image.

Figure 4:
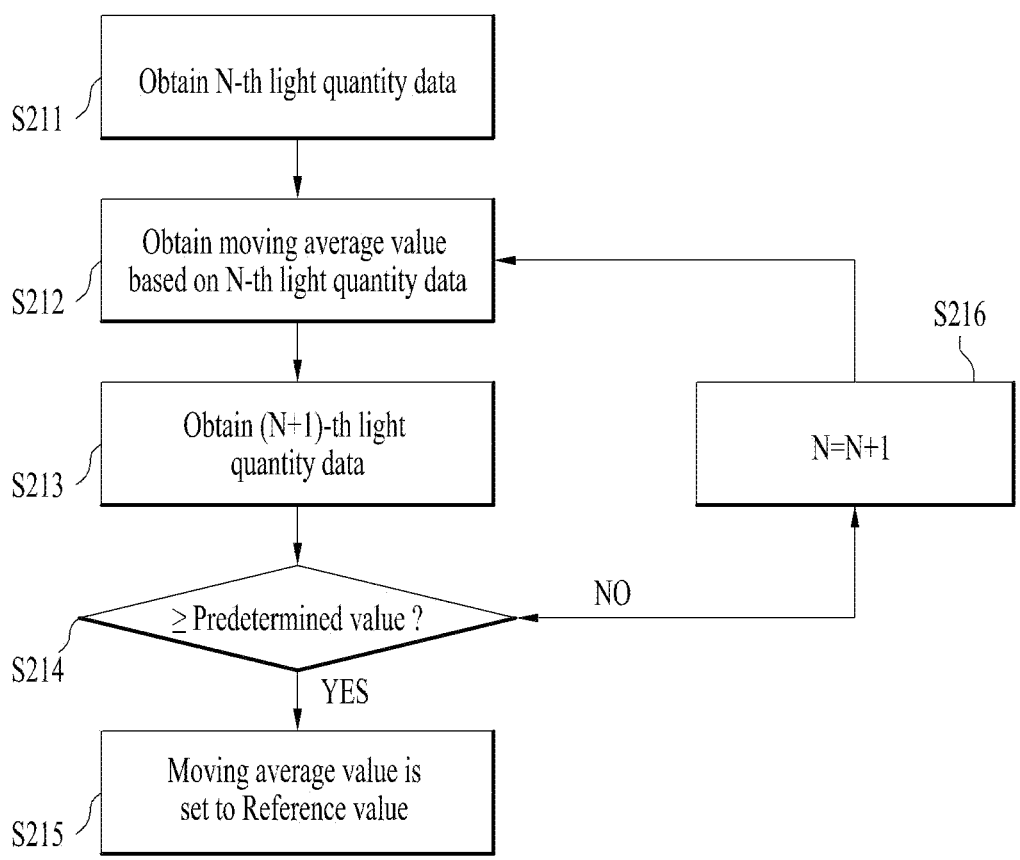
FIG. 4 is a flowchart illustrating operations of a process for establishing a reference value of the proximity sensor according to an embodiment of the present disclosure.

FIG. 4 is a flowchart illustrating operations of a process for establishing the reference value of the proximity sensor according to an embodiment of the present disclosure. In more detail, FIG. 4 may correspond to step S210 shown in FIG. 3.

The proximity sensor according to the present disclosure can always remain active, so that the proximity sensor can obtain light quantity data in real time or at intervals of a predetermined time. Here, the proximity sensor may optionally operate through a motion sensor included in the mobile terminal. For convenience of description and better understanding of the present disclosure, the following description may assume that the proximity sensor is always maintained in the active state.

The proximity sensor may acquire N-th light quantity data (S211), and may obtain a moving average value by reflecting the N-th light quantity data (S212). In this case, the moving average value obtained based on the N-th light quantity data may be obtained by averaging the N-th light quantity data and light quantity data that has been continuously obtained a predetermined number of times. Specifically, the moving average value may be newly calculated whenever light quantity data is obtained as the average value of a predetermined number of the recent light quantity data segments obtained by the proximity sensor. For example, in order to calculate the moving average value, five light quantity data segments corresponding to the latest five light quantity data can be used. In this case, when the proximity sensor obtains the fifth light quantity data, the first to fifth light quantity data may be averaged to calculate the moving average value. Thereafter, after the sixth light quantity data is obtained, the second to sixth light quantity data may be averaged to calculate the moving average value.

The present disclosure obtains the moving average value by reflecting the N-the light quantity data, and then obtains the (N+1)-th light quantity data (S213).

The (N+1)-th light quantity data is compared with the moving average value in which the N-th light quantity data is reflected (S214). If a difference between the (N+1)-th light quantity data and the moving average value in which the N-th light quantity data is reflected is equal to or higher than a predetermined value (S214, Yes), the moving average value in which the N-th light quantity data is reflected can be set to the reference value (S215). If the peripheral environment sensed by the mobile terminal changes (e.g., if the user approaches the mobile terminal), light quantity data may abruptly change. If the light quantity data abruptly changes, the proximity sensor can determine values for determining the proximity of the target object. The proximity sensor may compare the moving average value in which the N-th light quantity data is reflected with the (N+1)-th light quantity data, and may recognize whether light quantity data has abruptly changed. For example, when the moving average value corresponds to 200 and the subsequently-obtained light quantity data corresponds to 250, which is higher than 230, the proximity sensor may determine that light quantity data has abruptly changed, so that the proximity sensor may determine the moving average value '200' obtained prior to the changed light quantity data to be a reference value. In this case, the reference value may correspond to a basic value for setting the first threshold and the second threshold.

If a difference between the (N+1)-th light quantity data and the moving average value in which the N-th light quantity data is reflected is not large (S214, No), the proximity sensor may not determine an additional reference value, and may obtain a new moving average value in which the (N+1)-th light quantity data is reflected (S216, S212).

The proximity sensor may continuously obtain light quantity data, and may newly calculate a moving average value in response to each light quantity datum. If a difference between the newly obtained light quantity data and the updated moving average value is not large, the proximity sensor need not distinguish whether the target object is in close proximity to the mobile terminal, so that the proximity sensor can newly calculate a moving average value based on the newly obtained light quantity data. If a difference between the newly obtained light quantity data and the updated moving average value is considered large, there is a need for the proximity sensor to determine whether the target object is in close proximity to the mobile terminal, so that the proximity sensor can determine the existing updated moving average value to be a reference value without newly updating the moving average value.

The reason why the reference value is variably established is to remove the peripheral environmental factors from the change of light quantity data. The proximity sensor may have difficulty in distinguishing the proximity of the target object using the fixed reference value. For example, when foreign materials are caught in a light emission portion of the proximity sensor, reflected light quantity data may be reduced regardless of the proximity of the target object. In addition, when ambient light is changed, an error may occur in light quantity data sensed by the proximity sensor. The proximity sensor may continuously calculate the moving average value. A moving average value obtained when there is a large change in light quantity data may be determined to be a reference value. This reference value may be determined to be a threshold for determining whether the target object approaches the mobile terminal, so that the remaining peripheral environmental factors other than the proximity of the target object can be removed from the obtained light quantity data.

Figure 5:
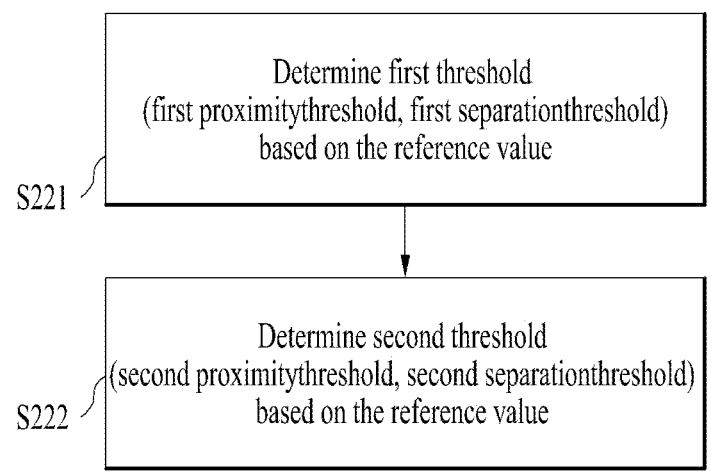
FIG. 5 is a flowchart illustrating operations of a process for establishing a first threshold and a second threshold of the proximity sensor according to an embodiment of the present disclosure.

FIG. 5 is a flowchart illustrating operations of a process for establishing a first threshold and a second threshold of the proximity sensor according to an embodiment of the present disclosure. In more detail, FIG. 5 may correspond to step S220 of FIG. 3.

The proximity sensor may determine a threshold based on the established reference value. In this case, the threshold may be a discriminable value capable of directly determining whether the target object is in close proximity to the mobile terminal. The reference value may be determined based on light quantity data that is obtained in the situation where the target object is not located in the vicinity of the mobile terminal. Therefore, the reference value may be less than light quantity data that is obtained from the target object approaching the mobile terminal. The threshold may be a discriminable value for distinguishing the case in which the target object is spaced apart from the proximity sensor within a predetermined distance or less, and it may be preferable that the threshold be higher than the reference value. That is, the proximity sensor may establish or determine a threshold by adding a constant to the reference value.

When the proximity sensor establishes or determines the threshold, a threshold for the proximity state (hereinafter referred to as a proximity threshold) or a threshold for the separation state (hereinafter referred to as a separation threshold) can be established. In this case, the proximity threshold may be higher than the separation threshold. When the obtained light quantity data is greater than the proximity threshold, the proximity sensor may determine the proximity state of the target object. Likewise, if the obtained light quantity data is smaller than the separation threshold, the proximity sensor may determine the separation state of the target object. When the obtained light quantity data is greater than the separation state but is less than the proximity threshold, the proximity sensor may determine that the distance between the target object and the mobile terminal remains unchanged. That is, the proximity sensor may determine that the existing state of the target object is maintained. For example, when establishing the reference value, the proximity sensor may determine that the target object is in the separation state. If light quantity data obtained after the reference value is established is greater than the proximity threshold, the proximity sensor may determine that the target object is in the proximity state. When light quantity data obtained from the target object staying in the proximity state is greater than the separation threshold but is less than the proximity threshold, this means that the proximity state of the target object is maintained. Similarly, when light quantity data obtained after the reference value is established is less than the separation threshold, the proximity sensor may determine that the target object is in the separation state. If light quantity data obtained from the target object staying in the separation state is greater than the separation threshold but is less than the proximity threshold, this means that the separation state of the target object is maintained.

The mobile terminal may establish or determine the first threshold based on the reference value (S221), and may establish or determine the second threshold higher than the first threshold (S222). However, the first threshold and the second threshold may be determined based on the reference value. After the second threshold is established, the first threshold may be established. Alternatively, the first threshold and the second threshold may be simultaneously established. In this case, the first threshold may include the proximity threshold, and the second threshold may include the separation threshold.

The first threshold may include a first proximity threshold and a first separation threshold. The second threshold may include a second proximity threshold and a second separation threshold. The mobile terminal according to the present disclosure may distinguish occurrence of two proximity states of the target object using the first threshold and the second threshold of the proximity sensor. The reason why the second threshold as well as the first threshold is established (or the reason why the first threshold as well as the second threshold is established) is to distinguish occurrence of two proximity states of the target object within many more distance ranges. A detailed description thereof will be given later with reference to the drawings from FIG. 7.

Figure 6:
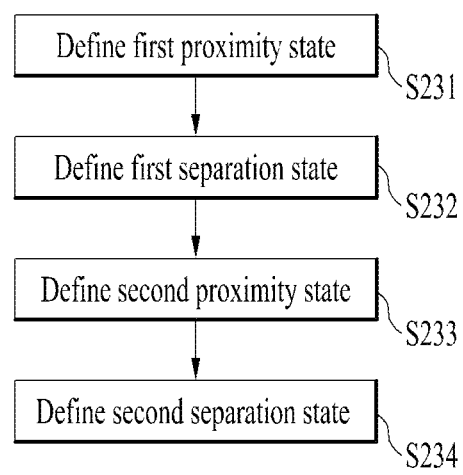
FIG. 6 is a flowchart illustrating operations of a process for waking up a device by determining whether a target object moves in close proximity to the device two times according to the present disclosure.

FIG. 6 is a flowchart illustrating operations of a process for waking up a device by determining whether the target object moves in close proximity to the device two times according to the present disclosure. In more detail, FIG. 6 may correspond to step S230 shown in FIG. 3.

The mobile terminal according to the present disclosure may obtain light quantity data using the proximity sensor, and may determine (or define) whether the target object is in close proximity to the mobile terminal in response to a change of the obtained light quantity data. Specifically, the mobile terminal according to the present disclosure can determine (or define) an operation state, which is provided before the proximity sensor establishes the reference value, to be the separation state of the target object. Step provided before the reference value is established may be a step of updating the moving average value, and this updating step may be a state in which the peripheral environment sensed by the mobile terminal is not greatly changed. Preferably, the step in which the peripheral environment sensed by the mobile terminal is not changed may refer to a stage in which the user's motion is not detected at a proximity location where the target object is in close proximity to the mobile terminal, and may be defined as the separation state of the target object. After the first threshold and the second threshold are established based on the reference value, the mobile terminal according to the present disclosure can sense a change in the continuously obtained light quantity data, so that the mobile terminal can distinguish occurrence of two proximity states of the target object approaching the mobile terminal.

The mobile terminal according to the present disclosure may sense a change of light quantity data, and may define the first proximity state based on the sensed change (S231). Here, the process of defining the first proximity state may use the first threshold. In more detail, the first proximity threshold of the first threshold may be used in the case of defining the first proximity state. The process of defining the first proximity state need not use the second threshold. In the process of using the first threshold, the first proximity state can be defined at a longer distance between the target object and the mobile terminal as compared to the other process of using the second threshold.

The mobile terminal may define the first proximity state, may recognize the change of the obtained light quantity data, and may thus define the first separation state (S231). Here, the process of defining the first proximity state may use the first threshold or the second threshold. In more detail, the first separation threshold of the first threshold or the second separation threshold of the second threshold may be used. If the user's hand approaches the mobile terminal within a wide range, the first separation state can be defined based on the first separation threshold. In contrast, when the user's hand approaches closer to the mobile terminal within a short range, the first separation state can be defined based on the second threshold.

The mobile terminal may define the first separation state, may recognize the change of the obtained light quantity data, and may thus define the second proximity state (S233). Here, the process of defining the second proximity state may use the first threshold or the second threshold. In more detail, when the first separation state is defined using the first separation threshold, the second proximity state can be defined using the first proximity threshold. When the first separation state is defined using the second separation threshold, the second proximity state can be defined using the second separation threshold.

The second separation state may be defined based on the change of light quantity data obtained after the second proximity state is defined (S234). In this case, the process of defining the second separation state may use the first threshold or the second threshold. In more detail, the first separation threshold or the second separation threshold may be used. If the second proximity state is defined using the first proximity threshold, the second separation state can be defined using the first separation threshold. In addition, when the second proximity state is defined using the second proximity threshold, the second separation state can be defined using the second separation threshold.

If a first proximity state, a first separation state, a second proximity state, and a second separation state are sequentially defined within a predetermined time from a time of setting the reference value, this means that a specific condition in which the target object approaches closer to the mobile terminal two times (i.e., two proximity states of the target object) is satisfied.

Figure 7:
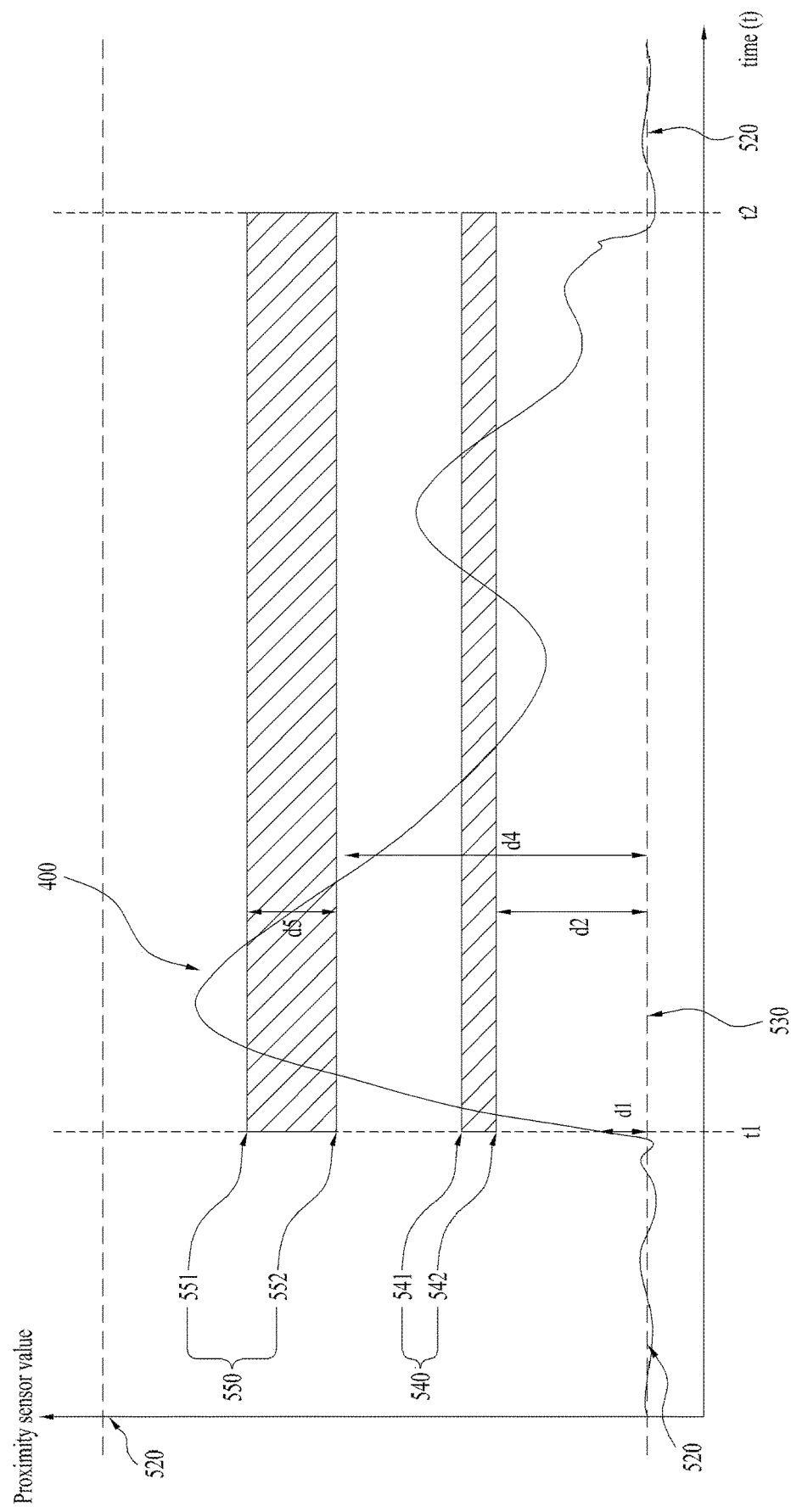
FIG. 7 is a conceptual diagram illustrating values established in the proximity sensor in response to a change in light quantity data obtained by the proximity sensor according to an embodiment of the present disclosure.

FIG. 7 is a conceptual diagram illustrating values established in the proximity sensor in response to a change in light quantity data obtained by the proximity sensor according to an embodiment of the present disclosure.

The proximity sensor may continuously obtain light quantity data 400. FIG. 7 illustrates one example of continuously obtaining the light quantity data 400, but it can be recognized that the light quantity data 400 is periodically obtained at intervals of a predetermined time.

As the target object moves closer to the mobile terminal, the amount of light quantity data detected by the proximity sensor may increase. For convenience of description, maximum amount of light quantity data capable of being sensed by the proximity sensor may be denoted by 510. The maximum amount of light quantity data will hereinafter be referred to as maximum light quantity data for convenience of description. Therefore, when the separation distance between the target object and the mobile terminal is equal to or shorter than a predetermined distance corresponding to the maximum light quantity data 510, the light quantity data value obtained by the proximity sensor may remain unchanged. For example, assuming that light quantity data obtained when the target object is located within 3 cm from the mobile terminal corresponds to the maximum light quantity data 510, even if the separation distance between the target object and the mobile terminal becomes shorter than 3 cm, light quantity data capable of being obtained by the proximity sensor may be unchanged.

The proximity sensor may calculate a moving average value 520 using the obtained light quantity data 400. In this case, the moving average value may be calculated using a predetermined number of the latest light quantity data, and new light quantity data may be obtained, so that the moving average value 520 can be updated.

In the present disclosure, after the moving average value 520 is calculated based on the N-th light quantity data, light quantity data is obtained after the (N+1)-th light quantity data is calculated. If a difference between the obtained light quantity data and the moving average value 520 is equal to or larger than a predetermined value (d), the moving average value 520 calculated based on the N-th light quantity data may be set to a reference value 530. As can be seen from FIG. 7, the proximity sensor may continuously obtain light quantity data 400 to update the moving average value 520. Then, if the difference between the light quantity data 400 obtained at a time point (t1) and the moving average value 520 is equal to or greater than a predetermined value (d1), the moving average value 520 at the time point (t1) may be set to the reference value 530. In a time period prior to the time point (t1), the moving average value 520 can be updated based on the newly obtained light quantity data 400. In contrast, the reference value 530 established after the time point (t1) may not be updated, and may be fixed until the moving average value 520 is again calculated after the time point (t2).

In the present disclosure, a first threshold 540 and a second threshold 550 may be established or determined based on the reference value 530. The first threshold 540 may include a first proximity threshold 541 and a first separation threshold 542. The second threshold 550 may include a second proximity threshold 551 and a second separation threshold 552. Specifically, the first separation threshold 542 may be spaced apart from the reference value 530 by a predetermined value (d2), and the first proximity threshold 541 may be spaced apart from the first separation threshold 542 by a predetermined value (d3). In addition, the second separation threshold 552 may be spaced apart from the reference value 530 by a predetermined value (d4), and the second proximity threshold 551 may be spaced apart from the second separation threshold 552 by a predetermined value (d5). In this case, the second proximity threshold 551 may have the highest value, the second separation threshold 552 may have a second high value lower than the second proximity threshold 551, the first proximity threshold 541 may have a third high value lower than the second separation threshold 552, the first separation threshold 542 may have a fourth high value lower than the first proximity threshold 541, and the reference value 530 may have the lowest value lower than the first separation threshold 542. That is, the second proximity threshold 551, the second separation threshold 552, the first proximity threshold 541, the first separation threshold 542, and the reference value 530 may be sequentially arranged in descending numerical order. There is a need for the second proximity threshold 551 to be lower than the maximum light quantity data 510. Preferably, the difference (d5) between the second proximity threshold 551 and the second separation threshold 552 may be greater than the difference (d3) between the first proximity threshold 541 and the first separation threshold 542.

Figure 8:
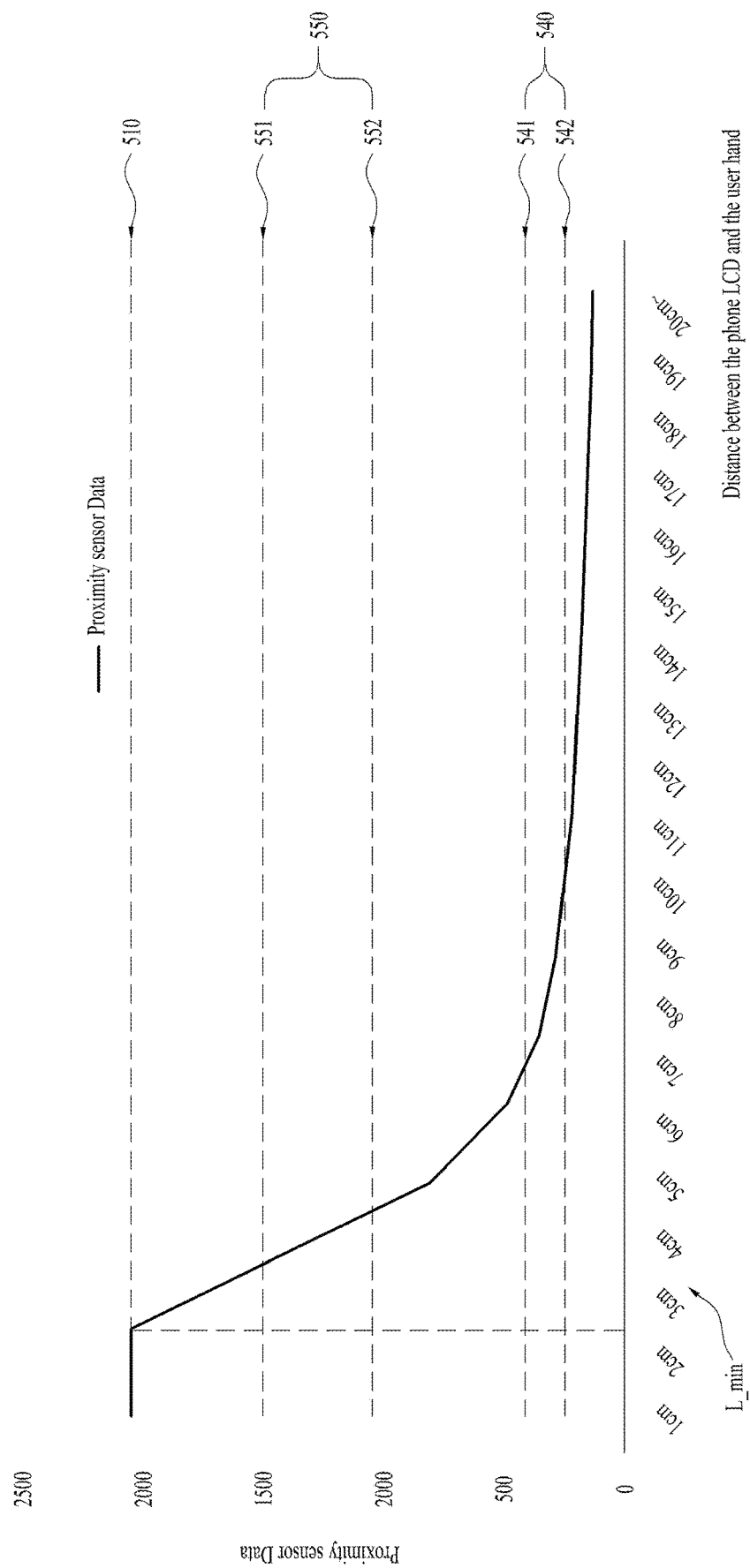

FIGS. 8 and 9 are diagrams illustrating light quantity data obtained by the proximity sensor in response to the distance between the mobile terminal and the target object according to an embodiment of the present disclosure.

The proximity sensor may refer to a sensor that emits light to a target object, senses light quantity data reflected from the target object, and thus determines a proximity state of the target object based on the sensed light quantity data. Therefore, as the target object moves closer to the proximity sensor, the amount of light quantity data sensed by the proximity sensor may increase.

The proximity sensor according to the present disclosure may be designed to have predetermined maximum light quantity data 510. Therefore, even when the separation distance between the target object and the mobile terminal is equal to or shorter than a predetermined distance (L_min) corresponding to the maximum light quantity data 510, the amount of light quantity data sensed by the proximity sensor may remain unchanged.

If the target object is spaced apart from the proximity sensor by at least a predetermined distance (L_min) corresponding to the maximum light quantity data 510, there arises a pattern in which light quantity data sensed by the proximity sensor exponentially increases as the target object approaches closer to the proximity sensor. Therefore, as the target object moves closer to the proximity sensor, the proximity sensor should be designed in a manner that a difference between the threshold for distinguishing the proximity state and the other threshold for distinguishing the separation state becomes larger as the target object moves closer to the proximity sensor. That is, a difference between the second proximity threshold 551 and the second separation threshold 552 should be greater than a difference between the first proximity threshold 541 and the first separation threshold 542.

A method for enabling the proximity sensor to distinguish occurrence of two proximity states of the target object using the first threshold 540 and the second threshold 550 will hereinafter be described with reference to the attached drawings.

FIGS. 10 to 14 are diagrams illustrating methods for determining whether the target object moves in close proximity to the mobile terminal two times using the first threshold and the second threshold according to the present disclosure. FIGS. 10 to 14 illustrate different embodiments, respectively. In FIGS. 10 to 14, the first threshold 540 and the second threshold 550 are differently displayed in response to the distances between the target object and the proximity sensor 500.

If a difference between light quantity data newly obtained by the proximity sensor and the moving average value 520 is equal to or greater than a predetermined value (d1) while the proximity sensor updates the moving average value 520, the proximity sensor may allow the moving average value to be fixed to the reference value 510 without updating the moving average value 520. In this case, the mobile terminal can establish the first threshold 540 and the second threshold 550 based on the reference value 510. The first threshold 540 may be configured to be higher than the reference value, and the second threshold 550 may be configured to be higher than the first threshold 540. The second threshold 550 may be configured to be lower than maximum light quantity data 510 that can be maximally sensed by the proximity sensor 550. The proximity sensor may obtain light quantity data in response to movement of the target object 600, may compare the obtained light quantity data with each of the first threshold 540 and the second threshold 550, and may thus distinguish occurrence of two proximity states of the target object 600 based on the result of comparison.

Figure 10:
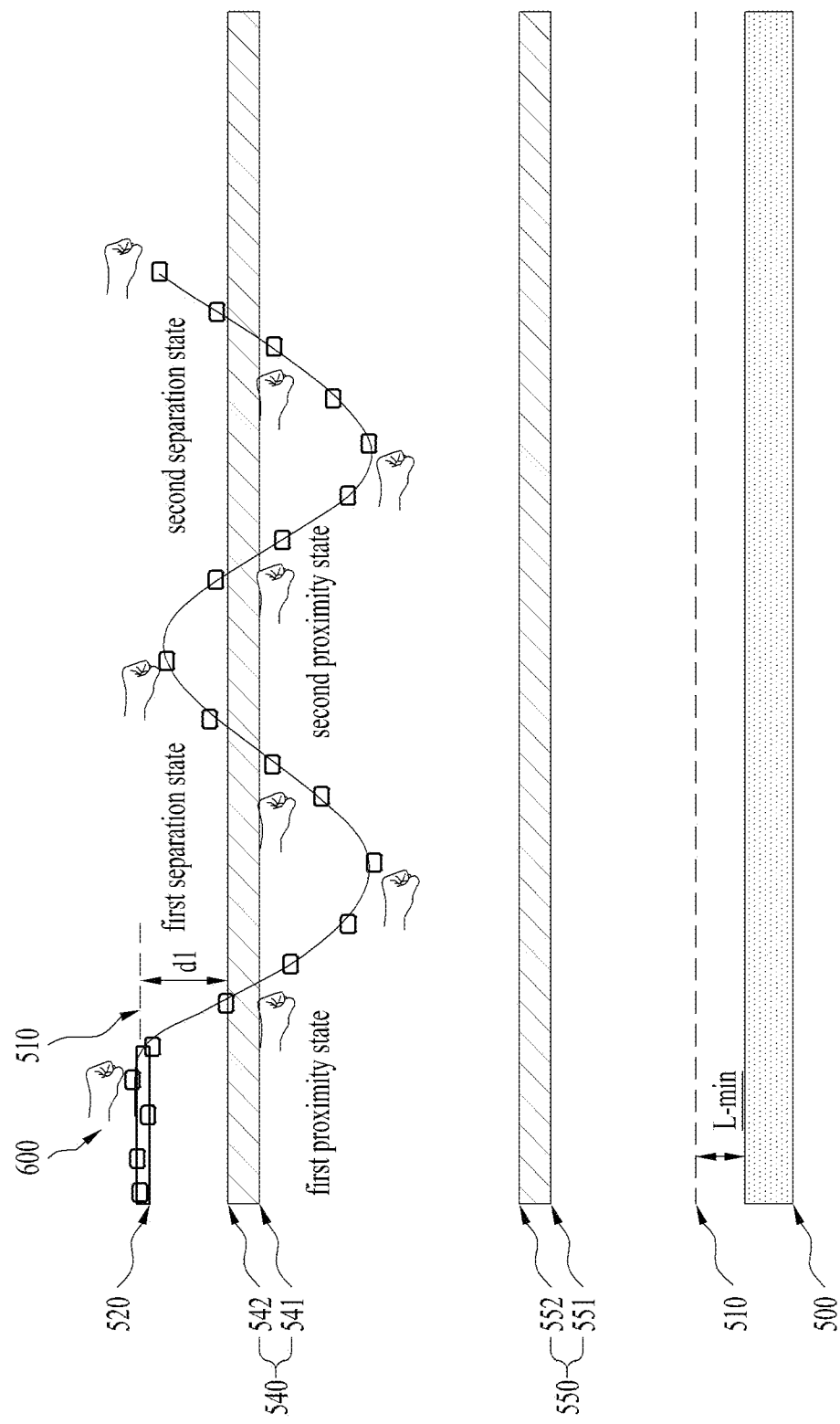
FIGS. 10 to 14 are diagrams illustrating methods for determining whether the target object moves in close proximity to the mobile terminal two times using a first threshold and a second threshold according to the present disclosure.

One embodiment relates to an example for enabling the proximity sensor to distinguish occurrence of two proximity states of the target object 600, and a detailed description thereof will hereinafter be given with reference to FIG. 10. If light quantity data obtained by the proximity sensor when the target object 600 approaches the mobile terminal is greater than the first proximity threshold 541, this means the first proximity state of the target object 600. After the first proximity state of the target object is defined, if the obtained light quantity data is less than the first separation threshold 542 while remaining less than the second proximity threshold 551, this means the first separation state of the target object 600. After the first separation state of the target object 600 is defined, if the obtained light quantity data is greater than the first proximity threshold 541 while remaining less than the first separation threshold 542, this means the second proximity state of the target object 600. In addition, after the second proximity state of the target object is defined, if the obtained light quantity data is less than the first separation threshold 542 while remaining less than the second proximity threshold 551, this means the second separation state of the target object. In this case, the mobile terminal according to the present disclosure can determine that the condition corresponding to occurrence of two proximity states of the target object has been satisfied.

Figure 11:
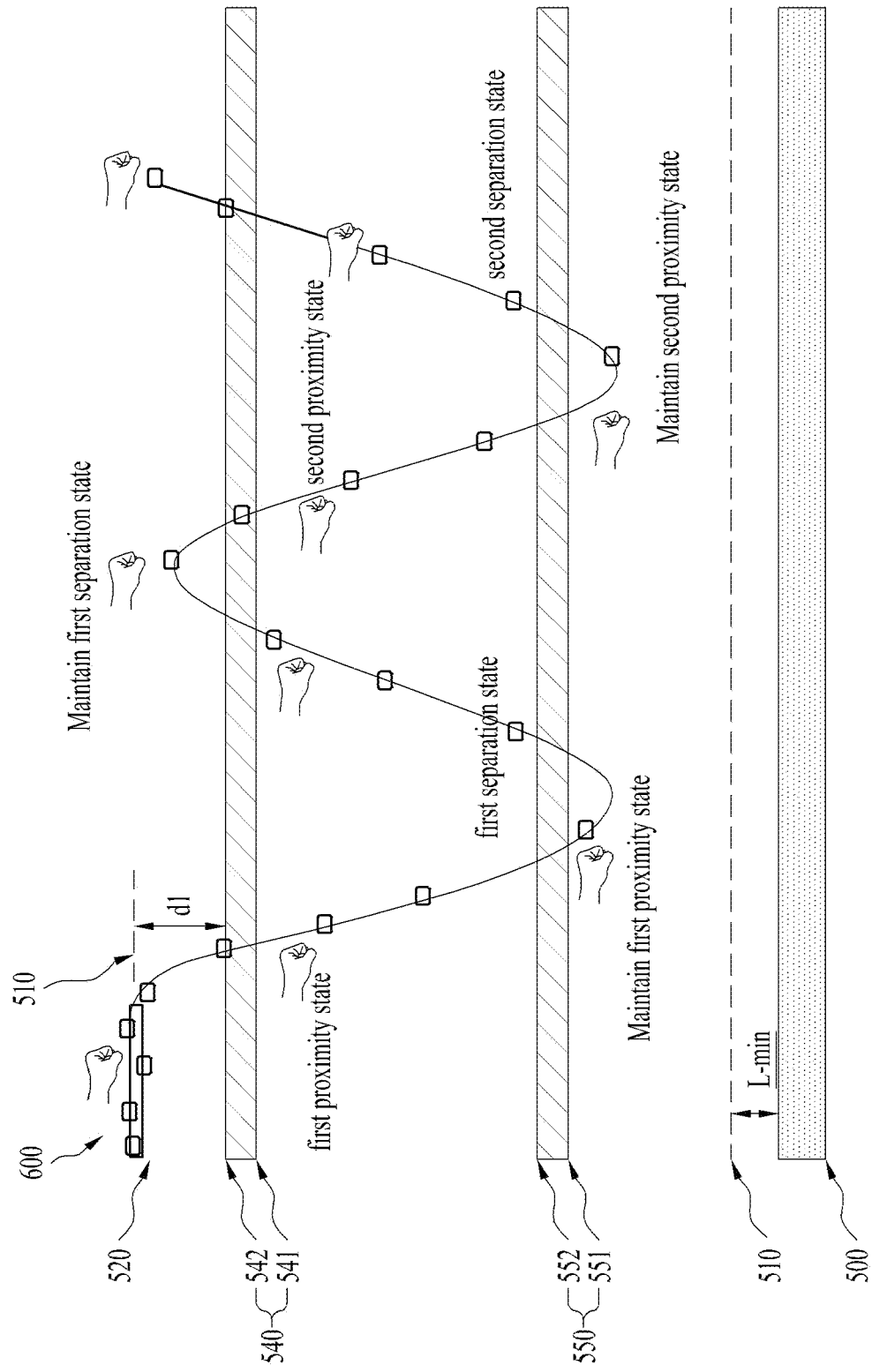

Another embodiment relates to another example of enabling the proximity sensor to distinguish occurrence of two proximity states of the target object 600, and a detailed description thereof will hereinafter be given with reference to FIG. 11. If light quantity data obtained by the proximity sensor because of the target object 600 approaching the proximity sensor is greater than the first proximity threshold 541, the proximity sensor may define (or determine) the first proximity state. After the proximity sensor defines the first proximity state, if the obtained light quantity data becomes larger than the second proximity threshold 551 while remaining larger than the first separation threshold 542, the first proximity state of the target object can be maintained by the proximity sensor. Thereafter, in the situation where the obtained light quantity data is less than the second proximity threshold 551, if the obtained light quantity data becomes larger than the second separation threshold 552, the proximity sensor can define the first separation state. After the first separation state is defined, if the obtained light quantity data becomes less than the first separation threshold 542 while remaining less than the second proximity threshold 551, the first separation state can be maintained by the proximity sensor. Thereafter, in the situation where the obtained light quantity data is less than the first separation threshold 542, if the obtained light quantity data becomes larger than the first proximity threshold 541, the proximity sensor can define the second proximity state. After the second proximity state is defined, if the obtained light quantity data becomes larger than the second proximity threshold 551 while remaining larger than the first separation threshold 542, the proximity sensor may enable the second proximity state to be maintained. Thereafter, in the situation where the obtained light quantity data is larger than the second proximity threshold 551, if the obtained light quantity data becomes less than the second separation threshold 552, the proximity sensor may determine the above situation to be the second separation state of the target object. In this case, the mobile terminal according to the present disclosure may determine that the condition corresponding to occurrence of two proximity states of the target object has been satisfied.

Figure 12:
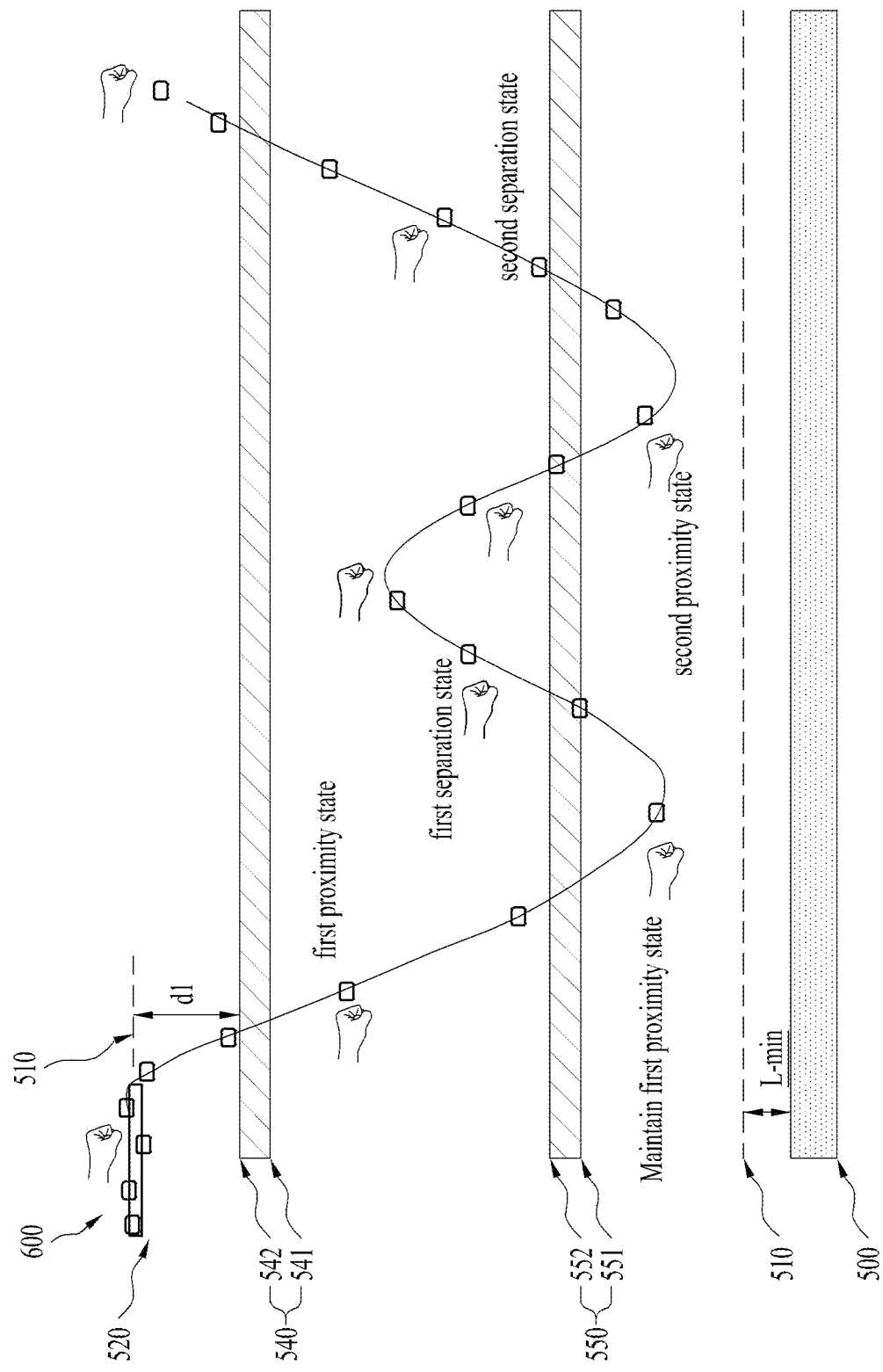

Another embodiment relates to another example of enabling the proximity sensor to distinguish occurrence of two proximity states of the target object 600, and a detailed description thereof will hereinafter be given with reference to FIG. 12. If light quantity data obtained by the proximity sensor because of the target object 600 approaching the proximity sensor is greater than the first proximity threshold 541, the proximity sensor may define (or determine) the first proximity state. After the proximity sensor defines the first proximity state, if the obtained light quantity data becomes larger than the second proximity threshold 551 while remaining larger than the first separation threshold 542, the first proximity state of the target object can be maintained by the proximity sensor. Thereafter, in the situation where the obtained light quantity data is less than the second proximity threshold 551, if the obtained light quantity data becomes larger than the second separation threshold 552, the proximity sensor can define the first separation state. After the first separation state is defined, if the obtained light quantity data becomes larger than the second proximity threshold 551 while remaining larger than the first separation threshold 542, the proximity sensor can define the second separation state. After the second proximity state is defined, if the obtained light quantity data becomes less than the second separation threshold 552 while remaining larger than the second proximity threshold 551, the proximity sensor can define the second separation state. In this case, the mobile terminal according to the present disclosure may determine that the condition corresponding to occurrence of two proximity states of the target object has been satisfied.

Figure 13:
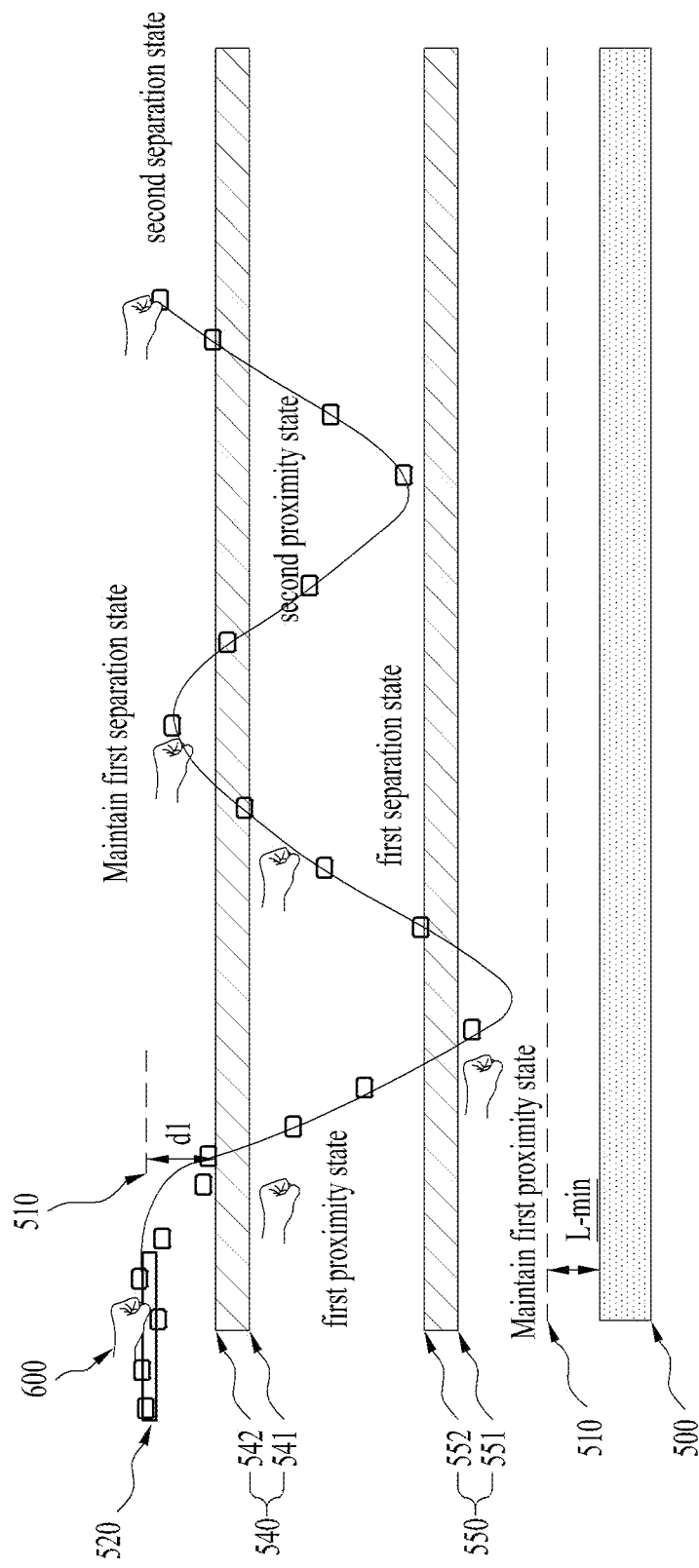
Figure 14:
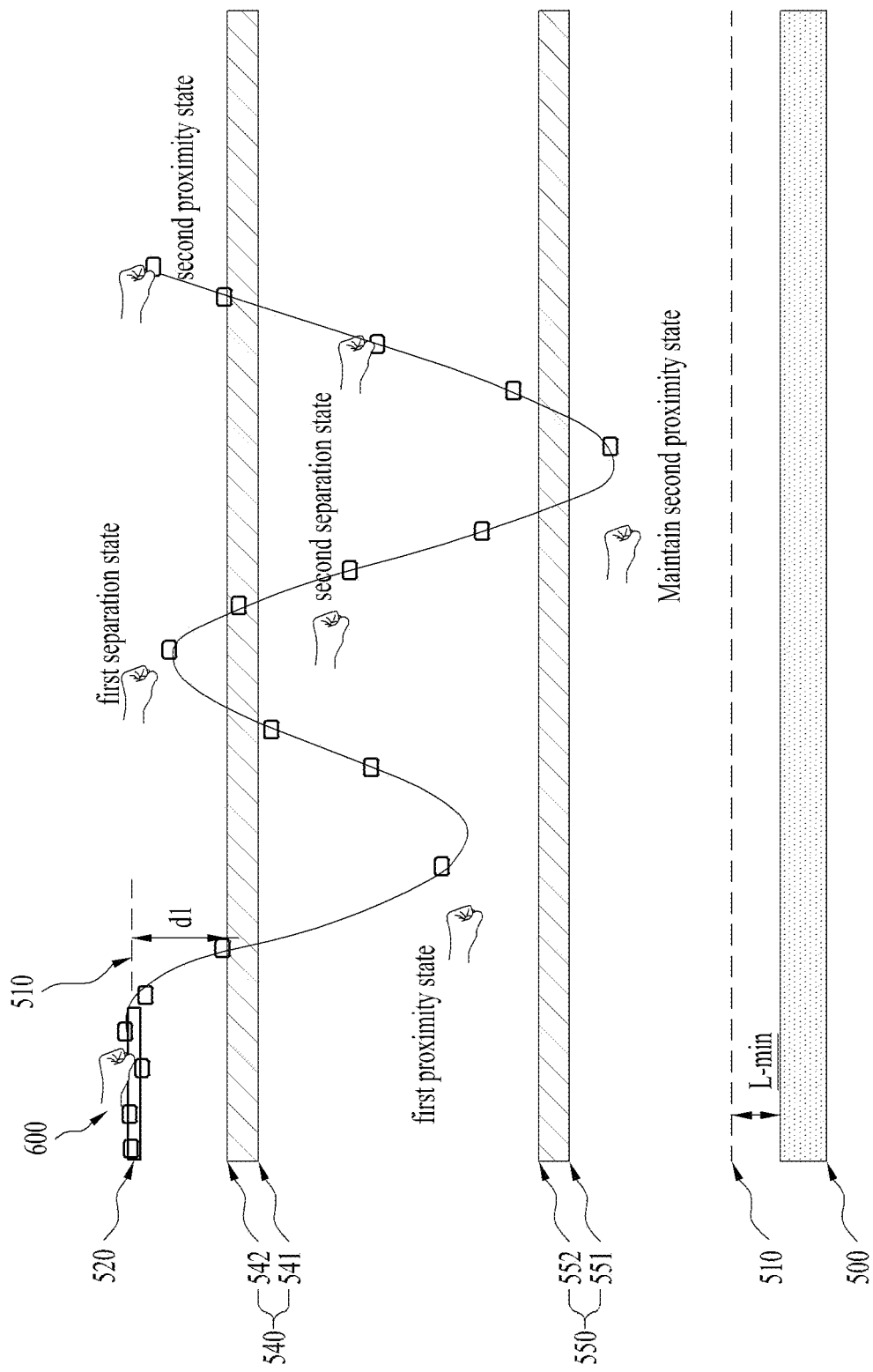

Another embodiment relates to another example of enabling the proximity sensor to distinguish occurrence of two proximity states of the target object 600, and a detailed description thereof will hereinafter be given with reference to FIG. 13. If light quantity data obtained by the proximity sensor because of the target object 600 approaching the proximity sensor is greater than the first proximity threshold 541, the proximity sensor may define (or determine) the first proximity state. After the proximity sensor defines the first proximity state, if the obtained light quantity data becomes larger than the second proximity threshold 551 while remaining larger than the first separation threshold 542, the first proximity state of the target object 600 can be maintained by the proximity sensor. Thereafter, in the situation where the obtained light quantity data is less than the second proximity threshold 551, if the obtained light quantity data becomes larger than the second separation threshold 552, the proximity sensor can define the first separation state. After the first separation state is defined, if the obtained light quantity data becomes less than the first separation threshold 542 while remaining less than the second proximity threshold 551, the first separation state can be maintained by the proximity sensor. Thereafter, in the situation where the obtained light quantity data is less than the first separation threshold 542, if the obtained light quantity data becomes larger than the first proximity threshold 541, the proximity sensor can define the second proximity state. After the second proximity state is defined, if the obtained light quantity data becomes less than the second separation threshold 542 while remaining less than the second proximity threshold 551, the proximity sensor can define the second separation state. In this case, the mobile terminal according to the present disclosure may determine that the condition corresponding to occurrence of two proximity states of the target object 600 has been satisfied.

Another embodiment relates to another example of enabling the proximity sensor to distinguish occurrence of two proximity states of the target object 600, and a detailed description thereof will hereinafter be given with reference to FIG. 11. If light quantity data obtained by the proximity sensor because of the target object 600 approaching the proximity sensor is greater than the first proximity threshold 541, the proximity sensor may define (or determine) the first proximity state. After the proximity sensor defines the first proximity state, if the obtained light quantity data becomes less than the first separation threshold 542 while remaining less than the second proximity threshold 541, the proximity sensor can define the first proximity state of the target object. Thereafter, in the situation where the obtained light quantity data is less than the first separation threshold 542, if the obtained light quantity data becomes larger than the first proximity threshold 541, the proximity sensor can define the second proximity state. After the first separation state is defined, if the obtained light quantity data becomes larger than the second proximity threshold 551 while remaining larger than the first separation threshold 542, the proximity sensor can enable the second proximity state to be maintained. Thereafter, in the situation where the obtained light quantity data is larger than the second proximity threshold 551, if the obtained light quantity data becomes less than the second separation threshold 552, the proximity sensor can define the second separation state. In this case, the mobile terminal according to the present disclosure may determine that the condition corresponding to occurrence of two proximity states of the target object has been satisfied.

FIGS. 15 to 20 are diagrams illustrating methods for determining whether the target object moves in close proximity to the mobile terminal two times using a first threshold and a second threshold according to the present disclosure.

Figure 15:
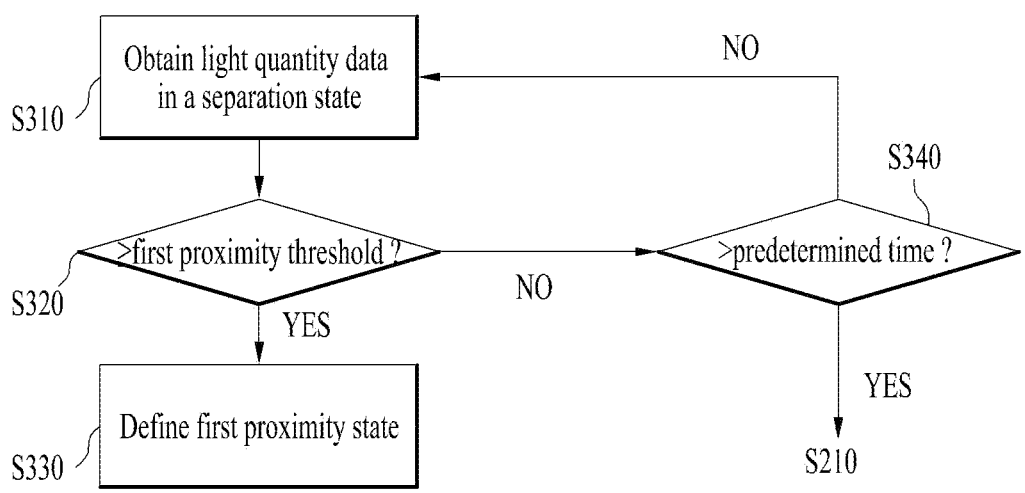
FIGS. 15 to 20 are diagrams illustrating methods for determining whether the target object moves in close proximity to the mobile terminal two times using a first threshold and a second threshold according to the present disclosure.

The mobile terminal according to the present disclosure may sense a first proximity state of the target object based on the first threshold, or may sense a proximity state of the target object based on the first threshold or the second threshold. FIG. 15 is a flowchart illustrating a process for enabling the mobile terminal to detect a first proximity of the target object based on the first threshold. In more detail, the present disclosure may assume that the target object is basically in the separation state in the process of establishing the reference value. The present disclosure may establish the reference value, and then obtain light quantity data in the separation state of the target object (S310).

Figure 16:
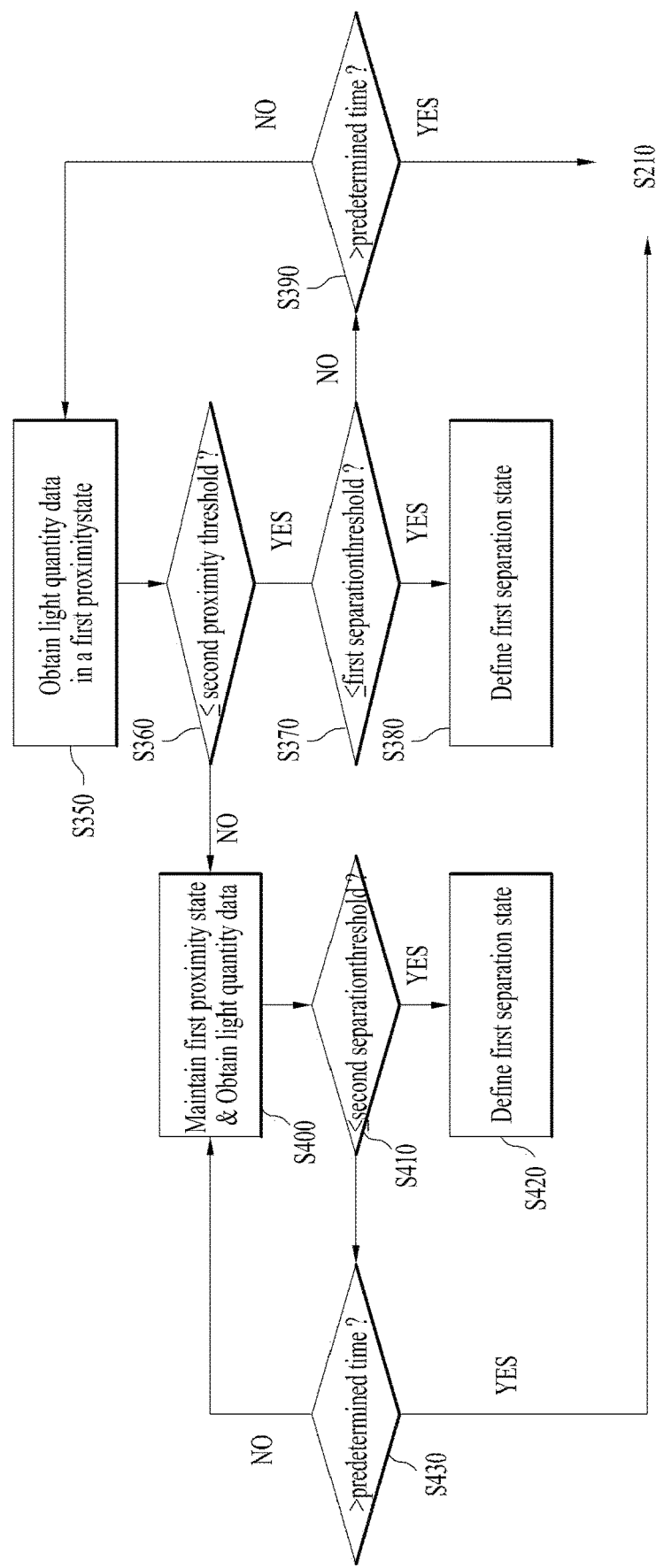

The mobile terminal according to the present disclosure may determine whether light quantity data obtained after the reference value is established is equal to or larger than the first proximity threshold (S320). If the obtained light quantity data is equal to or larger than the first proximity threshold (S320, Yes), the first proximity state can be defined (S330). In contrast, if the obtained light quantity data is less than the first proximity threshold (S320, No), the mobile terminal can recognize whether a time elapsed after the time of setting the reference value exceeds a predetermined time (S340). If the time elapsed after the time of setting the reference value does not exceed the predetermined time (S340, No), the additionally obtained light quantity data may be compared with the first threshold. If the time elapsed after the time of setting the reference value exceeds the predetermined time (S340, Yes), the reference value may be reset, the moving average value may be updated, and the reference value is then re-established (S210, FIG. 3). The mobile terminal according to the present disclosure may define the first separation state based on the first threshold in response to a change of light quantity data obtained after the first proximity state, or may define the first separation state based on the second threshold. FIG. 16 is a flowchart illustrating operations of a process for defining the first separation state after the first proximity state is defined. After the first proximity state is defined, light quantity data can be obtained (S350), and the obtained light quantity data may be compared with the second proximity threshold (S360). If light quantity data obtained in the first proximity state is equal to or less than the first proximity threshold (S360, Yes), and if the obtained light quantity data is equal to or less than the first separation threshold (S370, Yes), the first separation state can be defined (S380). If light quantity data obtained in the first proximity state is equal to or less than the first proximity threshold (S360, Yes), and if the obtained light quantity data is less than the first separation threshold (S370, No), the mobile terminal can recognize a time elapsed after the time of setting the reference value (S390). If the time elapsed after the time of setting the reference value is less than a predetermined time (S390, No), the mobile terminal can compare light quantity data additionally obtained in the first proximity state with each of the first proximity threshold and the first separation threshold. If a time elapsed after the time of setting the reference value is equal to or longer than a predetermined time (S390, Yes), the mobile terminal may return to step S210 (see FIG. 3) in which the moving average value is updated and at the same time the reference value is reset. If light quantity data obtained in the first proximity state is greater than the second proximity threshold (S360, No), the first proximity state can be maintained and additional light quantity data can be obtained (S400). If the first proximity state is maintained and the additionally obtained light quantity data is equal to or less than the second separation threshold (S410, Yes), the first separation state can be defined (S420). If the first proximity state is maintained and the additionally obtained light quantity data is greater than the second separation threshold (S410, No), the mobile terminal according to the present disclosure can compare the time elapsed after the time of setting the reference value with the predetermined time (S430). If the time elapsed after the time of setting the reference time does not exceed the predetermined time (S430, No), the additionally obtained light quantity data can be compared with the second separation threshold. If the time elapsed after the time of setting the reference value exceeds the predetermined time (S430, Yes), the mobile terminal may reset the reference value, and may return to step S210 (See FIG. 3) in which the mobile terminal updates the moving average value and then resets the reference value.

The present disclosure can define the second proximity state based on the first threshold in response to a change of light quantity data obtained after the first separation state, or can define the second proximity state based on the second threshold. Specifically, the threshold to be used for defining the second proximity state may be differently used according to which threshold is used to define the first separation state.

Figure 17:
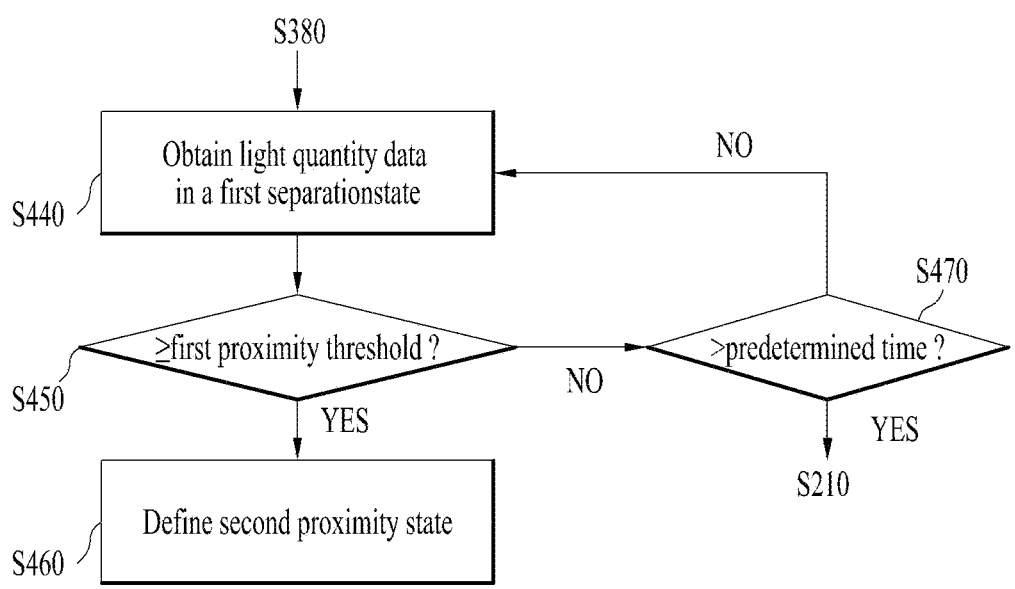

In more detail, FIG. 17 is a flowchart illustrating a method for defining the second proximity state using the first threshold when the first separation state is defined using the first threshold. After step S380 of FIG. 16, the mobile terminal according to the present disclosure can obtain light quantity data in the first separation state (S440), and can compare the obtained light quantity data with the first proximity threshold (S450). If the first proximity threshold obtained after step S380 of FIG. 16 is equal to or greater than the first proximity threshold (S450, Yes), the second proximity state can be defined (S460). If light quantity data obtained after step S380 of FIG. 16 is less than the first proximity threshold (S450, No), the mobile terminal may compare a time elapsed after the time of setting the reference value with a predetermined time (S470). If a time elapsed after the time of setting the reference value does not exceed the predetermined time (S470, No), the mobile terminal can compare the additionally obtained light quantity data with the first proximity threshold. If the time elapsed after the time of setting the reference value exceeds the predetermined time (S470, Yes), the mobile terminal may return to step S210 (see FIG. 3) in which the reference value is reset, the moving average value is updated and at the same time the reference value is reset.

Figure 18:
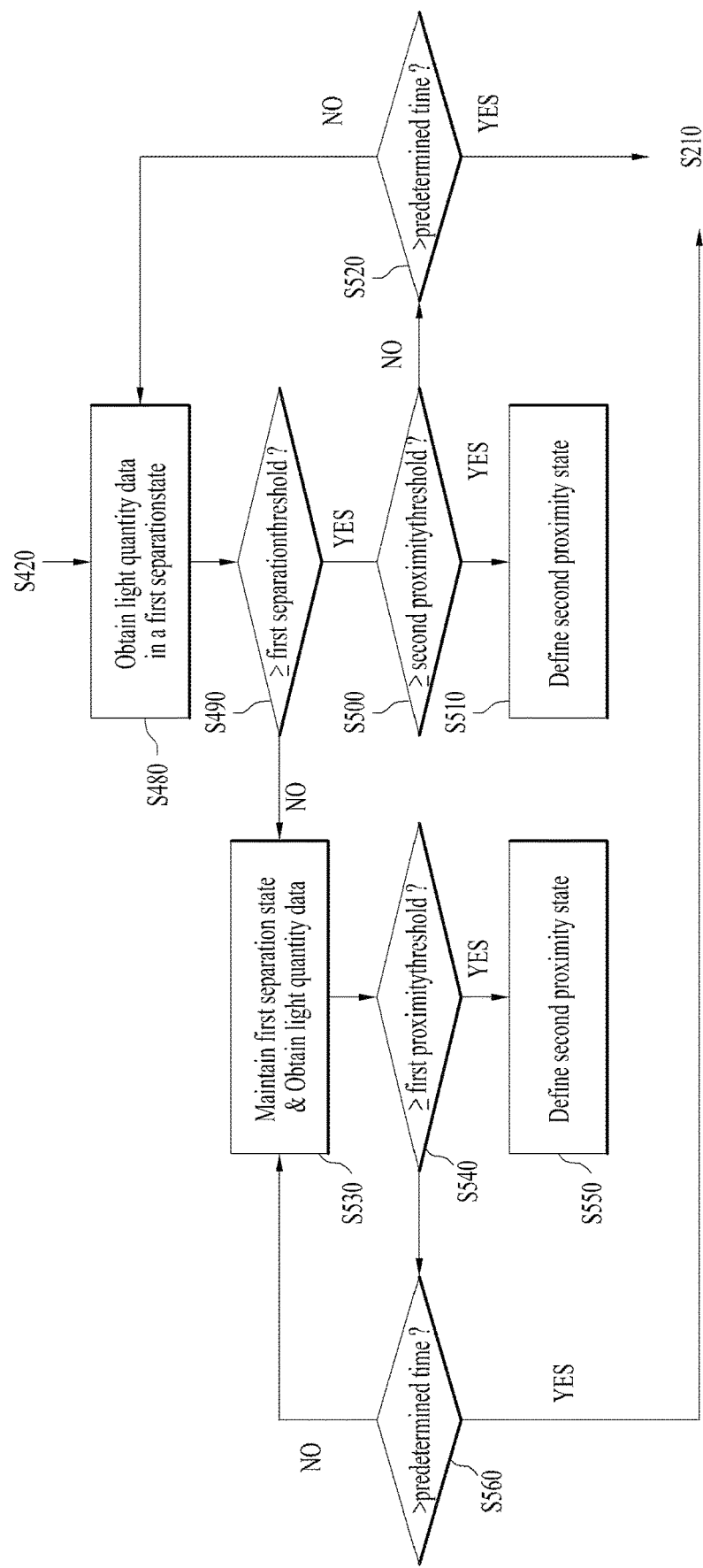

In more detail, FIG. 18 is a flowchart illustrating a method for defining the second proximity state using the first threshold and the second threshold in the situation where the first separation state is defined using the second threshold. After step S420 of FIG. 16, the mobile terminal according to the present disclosure can compare light quantity data obtained after the time of defining the first separation state with the first separation threshold (S490). If light quantity data obtained in the first separation state is equal to or greater than the second separation threshold (S500, Yes), the second proximity state can be defined (S510). If light quantity data obtained in the first separation state is equal to or greater than the second separation threshold (S490, Yes) and is greater than the second proximity threshold (S500, No), the mobile terminal can confirm the time elapsed after the time of setting the reference value. If the time elapsed after the time of setting the reference value is less than the predetermined time (S520, No), the mobile terminal can compare light quantity data additionally obtained in the first separation state with each of the first separation threshold and the second separation threshold. If the time elapsed after the time of setting the reference value is equal to or longer than a predetermined time (S520, Yes), the mobile terminal may reset the reference value, and may return to step S210 (see FIG. 3) in which the moving average value is updated and at the same time the reference value is reset. If light quantity data obtained in the first separation state is equal to or greater than the first separation threshold (S490, No), the mobile terminal can additionally obtain light quantity data while maintaining the first separation state (S530). If the first proximity state is maintained and the additionally obtained light quantity data is equal to or greater than the first proximity threshold (S540, Yes), the second proximity state can be defined (S550). If the additionally obtained light quantity data is less than the first proximity threshold in the first separation state (S540, No), the time elapsed after the time of setting the reference value is compared with the predetermined time (S560). If the time elapsed after the time of setting the reference value does not exceed the predetermined time (S560, No), the additionally obtained light quantity data can be compared with the first proximity threshold. If the time elapsed after the time of setting the reference value exceeds the predetermined time (S560, Yes), the mobile terminal may reset the reference value, and may return to step S210 (see FIG. 3) in which the moving average value is updated and the reference value is reset.

The mobile terminal according to the present disclosure may define the second separation state based on the first threshold in response to a change of light quantity data obtained after the second proximity state, or may define the second separation state based on the second threshold. Specifically, the threshold to be used for defining the second separation state may be changed differently according to which threshold is used to define the second proximity state.

Figure 19:
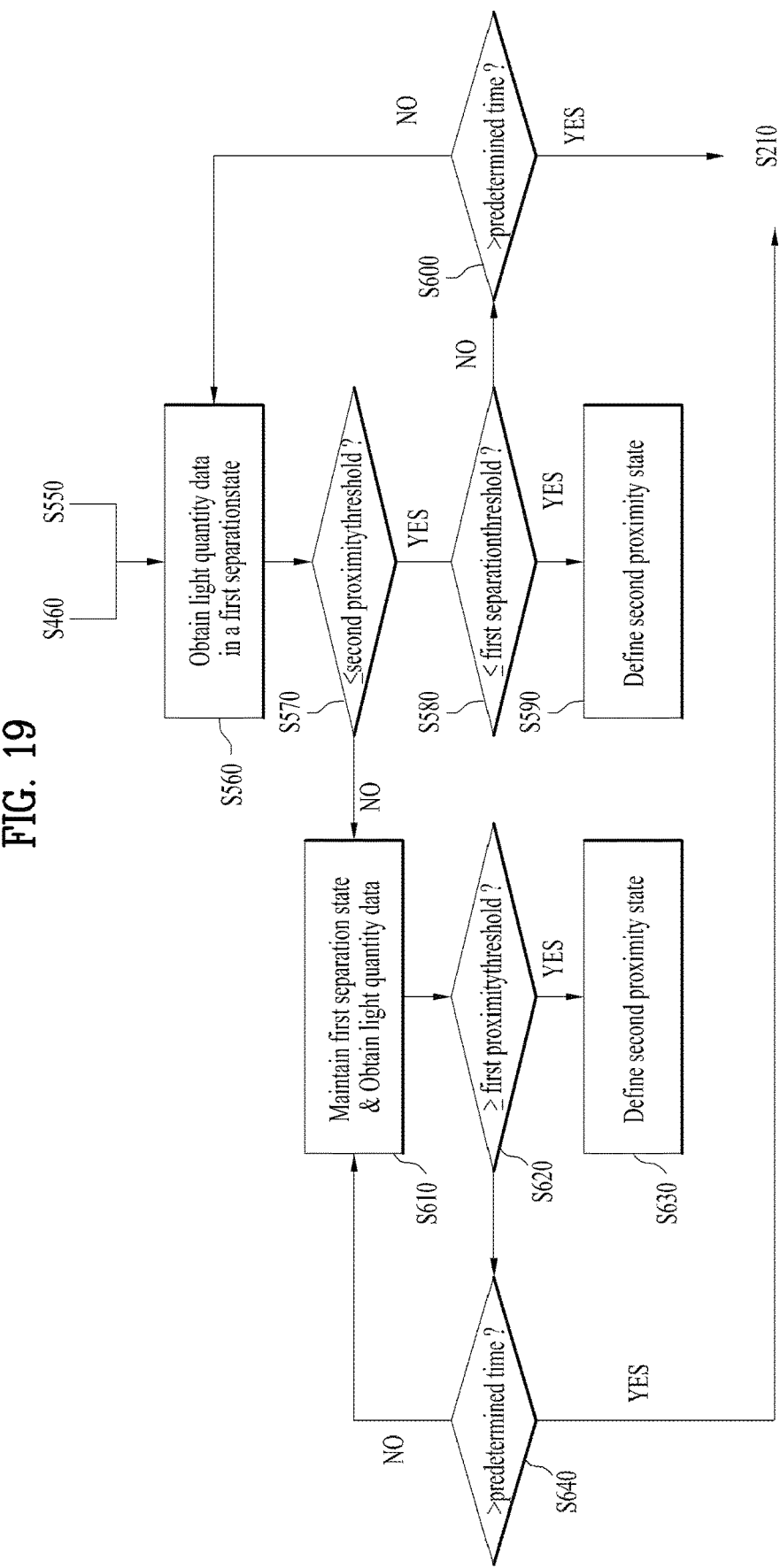

In more detail, FIG. 19 is a flowchart illustrating a method for defining the second proximity state after the second proximity state is defined using the first threshold. After step S460 of FIG. 17 or step S550 of FIG. 18, the mobile terminal may compare the obtained light quantity data with the second proximity threshold (S570). If light quantity data obtained in the second proximity state is equal to or less than the second proximity threshold (S570, Yes) and is equal to or less than the first separation threshold (S580, Yes), the second separation state can be defined (S590). If light quantity data obtained in the second proximity state is equal to or less than the second proximity threshold (S570, Yes) and is less than the second separation threshold (S580, No), the mobile terminal can confirm a time elapsed after the time of setting the reference value (S600). If the time elapsed after the time of setting the reference value is less than a predetermined time (S600, No), the mobile terminal can compare light quantity data additionally obtained in the second proximity state with each of the second proximity threshold and the first separation threshold. If the time elapsed after the time of setting the reference value is equal to or longer than the predetermined time (S600, Yes), the mobile terminal may reset the reference value, and may return to step S210 (see FIG. 3) in which the moving average value is updated and the reference value is reset. If light quantity data obtained in the second proximity state is greater than the second proximity threshold (S570, No), the mobile terminal can maintain the second proximity state and can additionally obtain light quantity data (S610). If light quantity data additionally obtained in the second proximity state is equal to or less than the second separation threshold (S620, Yes), the second separation state can be defined (S630). If light quantity data additionally obtained in the first proximity state is greater than the second separation threshold (S620, No), the mobile terminal can compare the time elapsed after the time of setting the reference value with a predetermined time (S640). If the time elapsed after the time of setting the reference value does not exceed the predetermined time (S640, No), the additionally obtained light quantity data can be compared with the second separation threshold. If the time elapsed after the time of setting the reference value exceeds the predetermined time (S640, Yes), the mobile terminal may reset the reference value, and may return to step S210 (see FIG. 3) in which the moving average value is updated and the reference value is reset.

Figure 20:
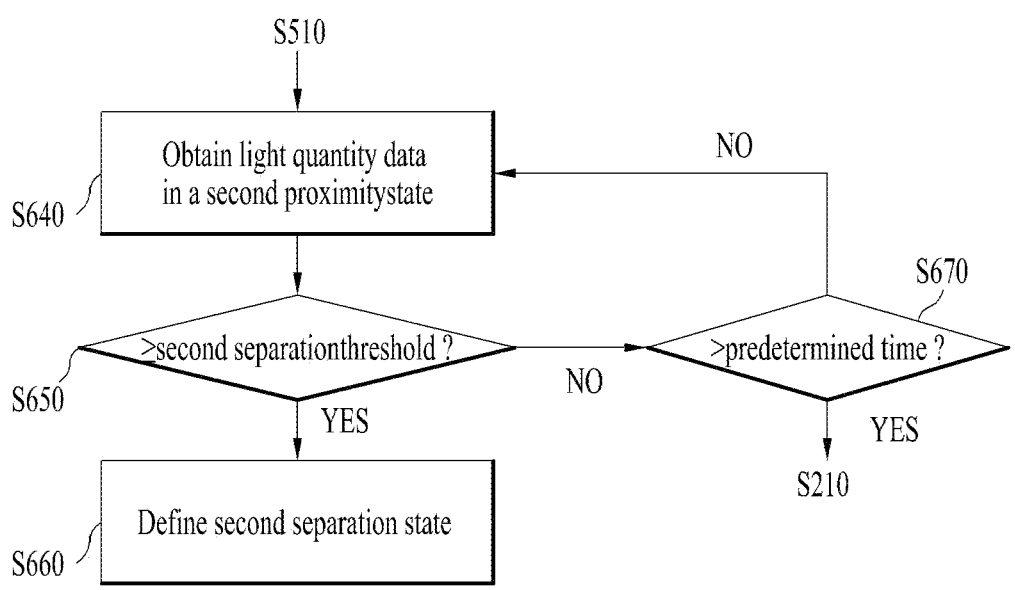

In more detail, FIG. 20 is a flowchart illustrating a method for defining the second separation state after the second proximity state is defined using the second threshold. After step S510 of FIG. 18, the mobile terminal may obtain light quantity data in the second proximity state (S640), and may compare the obtained light quantity data with the second separation threshold (S650). After step S510 of FIG. 18, if the obtained light quantity data is equal to or greater than the second separation threshold (S650, Yes), the second separation state can be defined (S660). After step S510 of FIG. 18, if the obtained light quantity data is less than the second separation threshold (S650, No), the mobile terminal may compare a time elapsed after the time of setting the reference value with the predetermined time (S670). If the time elapsed after the time of setting the reference value does not exceed the predetermined time (S670, No), the additionally obtained light quantity data can be compared with the first proximity threshold. If the time elapsed after the time of setting the reference value exceeds the predetermined time (S670, Yes), the mobile terminal may reset the reference value, and may return to step S210 (see FIG. 3) in which the moving average value is updated and the reference value is reset.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile terminals applicable to a technical field capable of providing an input signal through a hand motion of a user who does not directly touch the mobile terminal.

The invention claimed is:

1. A mobile terminal comprising:
a display unit configured to output visual information;
a depth camera configured to obtain a depth image by capturing a target object;
a proximity sensor configured to distinguish a proximity of the target object approaching the mobile terminal; and
a controller connected to the display unit, the depth camera, and the proximity sensor,
wherein the controller is configured to:
in response to sequentially sensing a first proximity and a first separation of the target object approaching or moving away from the mobile terminal within a predetermined amount of time, transition the display unit from an inactive state to an active state and display a graphical interface, and
in response to sequentially sensing the first proximity, the first separation, a second proximity, and a second separation of the target object approaching or moving away from the mobile terminal within the predetermined amount of time, transition the depth camera from an inactive state to an active state to obtain the depth image.

2. The mobile terminal according to claim 1, wherein:
the proximity sensor emits light to the target object, and distinguishes a proximity of the target object using light quantity data reflected from the target object.

3. The mobile terminal according to claim 2, wherein the proximity sensor is configured to perform operations including:
setting a reference value using a moving average value of the light quantity data; and
setting a first threshold greater than the reference value and a second threshold greater than the first threshold, and distinguishing a proximity or separation state of the target object based on the first threshold and the second threshold.

4. The mobile terminal according to claim 3, wherein the proximity sensor is configured to perform operations including:

obtaining the moving average value in response to N-th obtained light quantity data; and
if a difference between the N-th obtained light quantity data and (N+1)-th obtained light quantity data is at least a predetermined value, setting the moving average value obtained in response to the N-th obtained light quantity data to the reference value.

5. The mobile terminal according to claim 4, wherein the proximity sensor is configured to further perform operations including:
obtaining the moving average value by averaging the N-th obtained light quantity data and light quantity data that has been continuously obtained a predetermined number of times.

6. The mobile terminal according to claim 3, wherein:
the first threshold includes:
a first proximity threshold configured to define a proximity state of the target object; and
a first separation threshold less than the first proximity threshold, and configured to define a separation state of the target object; and
the second threshold includes:
a second proximity threshold configured to define a proximity state of the target object; and
a second separation threshold less than the second proximity threshold, and configured to define a separation state of the target object.

7. The mobile terminal according to claim 6, wherein:
a difference between the second proximity threshold and the second separation threshold is greater than a difference between the first proximity threshold and the first separation threshold.

8. The mobile terminal according to claim 6, wherein the controller is configured to perform operations including:
if light quantity data obtained through the proximity sensor is less than the first separation threshold and is then greater than the first proximity threshold, sensing the first proximity of the target object;
if light quantity data obtained after the first proximity of the target object is sensed is greater than the first proximity threshold and is then less than the first separation threshold, sensing the first separation of the target object;
if light quantity data obtained after the first separation of the target object is sensed is less than the first separation threshold and is then greater than the first proximity threshold, sensing the second proximity of the target object; and
if light quantity data obtained after the second proximity of the target object is sensed is less than the first proximity threshold and is then less than the first separation threshold, sensing the second separation of the target object.

9. The mobile terminal according to claim 6, wherein the controller is configured to perform operations including:
if light quantity data obtained through the proximity sensor is less than the first separation threshold and is then greater than the first proximity threshold, sensing the first proximity of the target object;
if light quantity data obtained after the first proximity of the target object is sensed is greater than the second proximity threshold and is then less than the second separation threshold, sensing the first separation of the target object;
if light quantity data obtained after the first separation of the target object is sensed is less than the first separation threshold and is then greater than the first proximity threshold, sensing the second proximity of the target object; and if light quantity data obtained after the second proximity of the target object is sensed is less than the second proximity threshold and is then less than the second separation threshold, sensing the second separation of the target object.

10. The mobile terminal according to claim 9, wherein the controller is configured to perform operations including:

if light quantity data obtained after the first proximity of the target object is sensed is less than the second separation threshold and is then greater than the second separation threshold, maintaining a first proximity state of the target object;

if light quantity data obtained after the first separation of the target object is sensed is greater than the first proximity threshold and is then less than the first separation threshold, sensing a second separation state of the target object; and if light quantity data obtained after the second proximity of the target object is sensed is less than the second separation threshold and is then greater than the second separation threshold, sensing a second proximity state of the target object.

11. The mobile terminal according to claim 6, wherein the controller is configured to perform operations including:

if light quantity data obtained through the proximity sensor is less than the first separation threshold and is then greater than the first proximity threshold, sensing the first proximity of the target object;

if light quantity data obtained after the first proximity of the target object is sensed is greater than the second proximity threshold and is then less than the second separation threshold, sensing the first separation of the target object;

if light quantity data obtained after the first separation of the target object is sensed is less than the second separation threshold and is then greater than the second proximity threshold, sensing the second proximity of the target object; and if light quantity data obtained after the second proximity of the target object is sensed is less than the second proximity threshold and is then less than the second separation threshold, sensing the second separation of the target object.

12. The mobile terminal according to claim 11, wherein the controller is configured to further perform operations including:

if light quantity data obtained after the first proximity of the target object is sensed is less than the second separation threshold and is then larger than the second separation threshold, maintaining a first proximity state of the target object.

13. The mobile terminal according to claim 6, wherein the controller is configured to perform operations including:

if light quantity data obtained through the proximity sensor is less than the first separation threshold and is then greater than the first proximity threshold, sensing the first proximity of the target object;

if light quantity data obtained after the first proximity of the target object is sensed is greater than the second proximity threshold and is then less than the second separation threshold, sensing the first separation of the target object;

if light quantity data obtained after the first separation of the target object is sensed is less than the first separation threshold and is then greater than the first proximity threshold, sensing the second proximity of the target object; and if light quantity data obtained after the second proximity of the target object is sensed is less than the first proximity threshold and is then less than the first separation threshold, sensing the second separation of the target object.

14. The mobile terminal according to claim 13, wherein the controller is configured to further perform operations including:

if light quantity data obtained after the first proximity of the target object is sensed is less than the second separation threshold and is then greater than the second separation threshold, maintaining a first proximity state of the target object; and if light quantity data obtained after the first separation of the target object is sensed is greater than the first proximity threshold and is then less than the first separation threshold, maintaining a first separation state of the target object.

15. The mobile terminal according to claim 6, wherein the controller is configured to perform operations including:

if light quantity data obtained through the proximity sensor is less than the first separation threshold and is then greater than the first proximity threshold, sensing the first proximity of the target object;

if light quantity data obtained after the first proximity of the target object is sensed is greater than the first proximity threshold and is then less than the first separation threshold, sensing the first separation of the target object;

if light quantity data obtained after the first separation of the target object is sensed is less than the first separation threshold and is then greater than the first proximity threshold, sensing the second proximity of the target object; and if light quantity data obtained after the second proximity of the target object is sensed is less than the second proximity threshold and is then less than the second separation threshold, sensing the second separation of the target object.

16. The mobile terminal according to claim 15, wherein the controller is configured to further perform operations including: if light quantity data obtained after the second proximity of the target object is sensed is less than the second separation threshold and is then greater than the second proximity threshold, maintaining a second proximity state of the target object.

17. The mobile terminal according to claim 3, wherein the controller is configured to perform operations including:

if the first proximity, the first separation, the second proximity, and the second separation of the target object are not sequentially sensed for the predetermined time after the reference value is set, resetting the reference value, and recalculating a moving average value based on the reset reference value.

18. The mobile terminal according to claim 17, wherein the controller is configured to perform operations including:

if a shape of a user hand is not distinguished from the depth image captured by the activated depth camera for a predetermined time, deactivating the depth camera, and recalculating a moving average value.

19. The mobile terminal according to claim 1, wherein the controller is configured to perform operations including:

if the depth camera is activated in a situation where the display unit is deactivated, activating the depth camera and the display unit.

20. A mobile terminal comprising:

a display unit configured to output visual information;

a depth camera configured to obtain a depth image by capturing a target object;

a proximity sensor configured to distinguish a proximity of the target object approaching the mobile terminal; and a controller connected to the display unit, the depth camera, and the proximity sensor, wherein if a first proximity, a first separation, a second proximity, and a second separation of the target object approaching or moving away from the mobile terminal are sequentially sensed within a predetermined amount of time, the controller activates the depth camera to obtain the depth image, wherein the controller is configured to distinguish a proximity or separation state of the target object based on a first threshold and a second threshold, wherein the first threshold and the second threshold are based on light quantity data corresponding to light reflected from the target object, wherein the first threshold includes:
 a first proximity threshold configured to define a proximity state of the target object; and
 a first separation threshold less than the first proximity threshold, and configured to define a separation state of the target object, and wherein the second threshold includes:
 a second proximity threshold configured to define a proximity state of the target object; and
 a second separation threshold less than the second proximity threshold, and configured to define a separation state of the target object.

* * * * *